US012752842B2

(12) United States Patent
Ein Waldt et al.

(10) Patent No.: US 12,752,842 B2
(45) Date of Patent: Oct. 6, 2026

(54) ELECTRONIC STEERING SYSTEMS FOR VEHICLES AND METHODS THEREOF

(71) Applicant: Ford Global Technologies, Dearborn, MI (US)

(72) Inventors: Alexander Ein Waldt, Cologne (DE); Sergio Codonesu, Aachen (DE); Goetz-Philipp Wegner, Dortmund (DE); Oliver Nehls, Düsseldorf (DE); Hannah Denomme, South Lyon, MI (US); Miguel Angel Bahena, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/170,905

(22) Filed: Apr. 4, 2025

(65) Prior Publication Data

US 2025/0326433 A1 Oct. 23, 2025

(30) Foreign Application Priority Data

Apr. 17, 2024 (DE) ........................ 102024110820.7

(51) Int. Cl.
*B62D 6/00* (2006.01)

(52) U.S. Cl.
CPC .................................... *B62D 6/008* (2013.01)

(58) Field of Classification Search
CPC .......... B62D 6/008; B62D 6/00; B62D 5/001; B62D 5/004; B62D 5/0481; B62D 5/0484; B60W 2050/029; B60W 10/20; B60W 50/023; B60W 50/029; B60W 50/16; B60W 2540/18
USPC ........................................ 701/41, 42, 43, 44
See application file for complete search history.

(56) References Cited

U.S. PATENT DOCUMENTS

| | | | |
|---|---|---|---|
| 6,208,923 | B1 | 3/2001 | Hommel |
| 6,820,715 | B2 | 11/2004 | Laurent et al. |
| 10,752,282 | B2 | 8/2020 | Klesing |
| 11,780,493 | B2 | 10/2023 | Shimizu et al. |

(Continued)

FOREIGN PATENT DOCUMENTS

| | | | |
|---|---|---|---|
| DE | 19834870 | A1 | 2/2000 |
| DE | 60221949 | T2 | 5/2008 |
| DE | 102019007715 | A1 | 5/2021 |

*Primary Examiner* — Hai H Huynh
(74) *Attorney, Agent, or Firm* — Lorne Forsythe; Hanley, Flight & Zimmerman, LLC

(57) ABSTRACT

Disclosed examples include a first feedback control device to control application of first feedback torque to a steering wheel via a first feedback channel; a second feedback control device independent of the first feedback control device, the second feedback control device to control application of second feedback torque to the steering wheel via a second feedback channel, the second feedback channel independent of the first feedback channel; and a third feedback control device independent of the first and second feedback control devices, the third feedback control device to control application of third feedback torque to the steering wheel via a third feedback channel, the third feedback channel independent of the first and second feedback channels, wherein ones of the first, second, and third feedback control devices are to control the application of corresponding ones of the first, second, and third feedback torques to the steering wheel.

20 Claims, 10 Drawing Sheets

(56) References Cited

U.S. PATENT DOCUMENTS

| | | | | |
|---|---|---|---|---|
| 2006/0253726 | A1 | 11/2006 | Kukshya et al. | |
| 2024/0227933 | A1* | 7/2024 | Kakas | B62D 15/025 |
| 2025/0136177 | A1* | 5/2025 | Lee | B62D 6/007 |
| 2025/0313259 | A1* | 10/2025 | Wong | B62D 5/006 |

* cited by examiner

ELECTRONIC STEERING SYSTEMS FOR VEHICLES AND METHODS THEREOF

RELATED APPLICATION

This patent claims priority from DE Patent Application Number 102024110820.7, which was filed on Apr. 17, 2024, and is hereby incorporated herein by reference in its entirety.

FIELD OF THE DISCLOSURE

The disclosure generally relates to methods of operating vehicles with electronic steering systems and to electronic steering systems for vehicles.

BACKGROUND

Electronic steering systems are an emerging steering technology that eliminates the mechanical link between the steering wheel and the road wheel and replaces it with two actuators: a steering wheel actuator with feedback, which generates feedback torque for the driver (on the steering wheel) and a road wheel actuator that controls the road wheels to the desired position.

SUMMARY

An example electronic steering system comprises a first feedback control device to control application of first feedback torque to a steering wheel via a first feedback channel, a second feedback control device independent of the first feedback control device, the second feedback control device to control application of second feedback torque to the steering wheel via a second feedback channel, the second feedback channel independent of the first feedback channel, and a third feedback control device independent of the first and second feedback control devices, the third feedback control device to control application of third feedback torque to the steering wheel via a third feedback channel, the third feedback channel independent of the first and second feedback channels, wherein ones of the first, second, and third feedback control devices are to control the application of corresponding ones of the first, second, and third feedback torques to the steering wheel by detecting at least one of a position or a movement of a steerable road wheel, determining the corresponding ones of the first, second, and third feedback torques based on the at least one of the position or the movement of the steerable road wheel, and controlling the application of the corresponding ones of the first, second, and third feedback torques to the steering wheel via corresponding ones of the first, second, and third feedback channels.

An example non-transitory machine-readable storage medium comprises instructions to cause at least a first feedback control device to control application of a first feedback torque to a steering wheel via a first feedback channel, a second feedback control device to control application of a second feedback torque to the steering wheel via a second feedback channel, the second feedback control device independent of the first feedback control device, and the second feedback channel independent of the first feedback channel, and a third feedback control device to control application of a third feedback torque to the steering wheel via a third feedback channel, the third feedback control device independent of the first and second feedback control devices, the third feedback channel independent of the first and second feedback channels, wherein ones of the first, second, and third feedback control devices are to control the application of corresponding ones of the first, second, and third feedback torques to the steering wheel by detecting at least one of a position or a movement of a steerable road wheel, determining the corresponding ones of the first, second, and third feedback torques based on the at least one of the position or the movement of the steerable road wheel, and controlling the application of the corresponding ones of the first, second, and third feedback torques to the steering wheel via corresponding ones of the first, second, and third feedback channels.

An example method comprises controlling, via a first feedback control device, application of a first feedback torque to a steering wheel via a first feedback channel, controlling, via a second feedback control device, application of a second feedback torque to the steering wheel via a second feedback channel, the second feedback control device independent of the first feedback control device, and the second feedback channel independent of the first feedback channel, and controlling, via a third feedback control device, application of a third feedback torque to the steering wheel via a third feedback channel, the third feedback control device independent of the first and second feedback control devices, the third feedback channel independent of the first and second feedback channels, wherein the controlling of the application of the first, second, and third feedback torques to the steering wheel includes detecting at least one of a position or a movement of a steerable road wheel, determining the corresponding ones of the first, second, and third feedback torques based on the at least one of the position or the movement of the steerable road wheel, and controlling the application of the corresponding ones of the first, second, and third feedback torques to the steering wheel via corresponding ones of the first, second, and third feedback channels.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Figure 1:
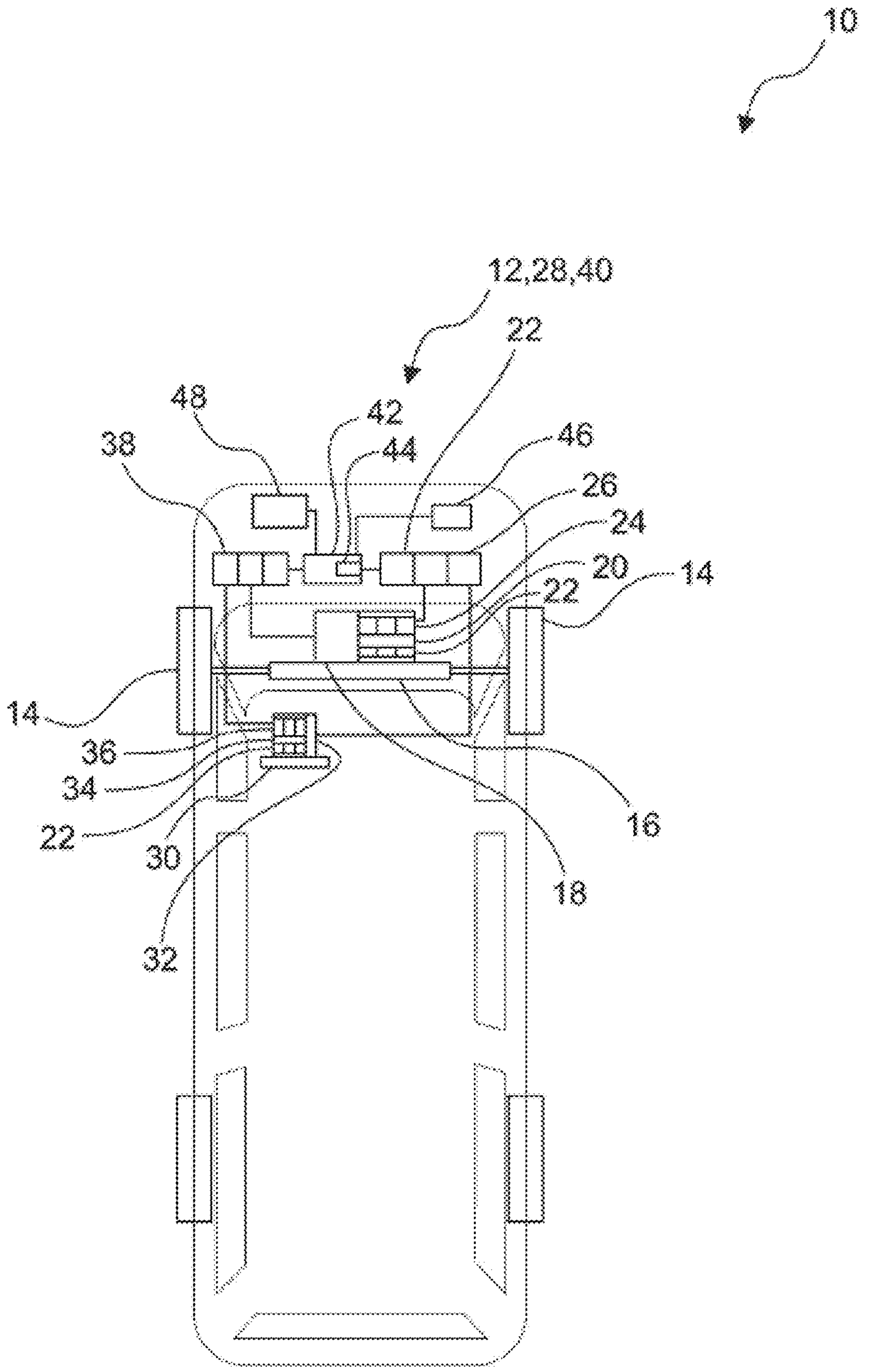
FIG. 1 shows a vehicle having an electronic steering system according to examples disclosed herein.

As an unexpected operating condition (e.g., a limited operating condition) in an electronic steering system could lead to loss of steering capability, the overall steering system should be designed with sufficient redundancy to ensure that the vehicle can always be transferred into a desired state, for example, to allow driving at very low speed (e.g., "crawling speed").

An electronic steering system that only provides one redundancy level would quickly (e.g., within a few minutes or even sooner) force the vehicle into a crawling state after a first unexpected operating condition, reducing the functionality of the vehicle. In addition, this transition represents a significant system change for the driver. For example, this can result in a generally uncomfortable, automatic reduction of the speed of the vehicle or even bring it to a stop. It is, therefore, known to provide additional redundancies so that the vehicle can at least still be operated.

Previous prior-art approaches provide, for example, redundancy in terms of the torque applied to the steerable road wheels. For example, systems for tertiary lateral control of the vehicle are used to implement the vehicle lateral control based on different torques, which are produced by electric motors (e.g., drive units) or deceleration devices (e.g., wheel brakes). Systems are also known which have multiple sensors to detect a steering input on a steering wheel of the vehicle, to use this steering input to determine a torque request based on independent control devices and to couple the steerable road wheels to redundant actuators, to ensure redundant control paths for the lateral control of the vehicle (for example DE 602 21 949 T2, DE 10 2019 007 715 A1, DE 198 34 870 A1 and US 2006/0253726 A1, U.S. Pat. No. 6,820,715 B2, U.S. Pat. No. 10,752,282 B2 and U.S. Pat. No. 11,780,493 B2). However, an unexpected operating condition of the electronic steering system can also affect the torque feedback to the driver, which is generated by a steering wheel actuator. Previous approaches, however, do not provide any or only simple redundancies related to torque feedback, so that the driver can be given incorrect torque feedback in the event of an unexpected operating condition, for example. This limits the comfort provided by the electronic steering system. In addition, the incorrect or missing torque feedback can also lead to generally unintentional steering instructions by the driver using the steering wheel. The functionality of the electronic steering system is therefore limited.

Examples disclosed herein eliminate or at least reduce the disadvantages of known methods of operating a vehicle with an electronic steering system and of electronic steering systems. In particular, examples disclosed herein may be used to implement an electronic steering system in such a way that the functionality and comfort of the electronic steering system are provided even in the event of additional unexpected operating state configurations (e.g., limited operating state configuration).

Some examples disclosed herein are reflected in the independent patent claims. Additional examples are reflected in the dependent claims and the following description, each of which may represent aspects of the disclosure in isolation or in (sub) combination. Some features are explained with regard to methods, others with regard to devices. However, the relevant aspects can be transferred to each other in a corresponding manner.

According to a first aspect, some examples of the disclosure relate to a method for operating a vehicle with an electronic steering system. The electronic steering system comprises at least a first, a second and a third independent feedback channel and at least a first and a second independent steering channel or at least a first and a second independent feedback channel and at least a first, a second and a third independent steering channel. The feedback channels each have at least one feedback control device. Each steering channel has at least one steering control device. The method comprises at least the following operations for at least two feedback channels independently: detecting a position and/or movement of the steerable road wheel of the vehicle or of the component coupled to the steerable road wheel and/or a position and/or movement of a steering wheel of the vehicle; determining a feedback torque by the feedback control device based on the detected position and/or movement; and outputting a torque to the steering wheel or a component coupled to the steering wheel based on the determined feedback torque.

The method comprises at least the following operations for each steering channel independently: detecting a position and/or movement of the steering wheel or the component coupled to the steering wheel; determining a torque request by the steering control device based on the detected position and/or movement; and outputting a torque to a steerable road wheel or a component coupled to the steerable road wheel based on the determined torque request.

Previous methods only provide redundancy in terms of the torque applied to the steerable road wheels to implement steering inputs. While this means that the functionality of the electronic steering system can still be maintained with regard to specific unexpected operating condition cases, the fact that unexpected operating conditions can also occur with regard to the torque feedback to the driver has so far been ignored. In the event of an unexpected operating condition affecting the torque feedback to the driver, according to previous approaches no further torque feedback can be provided. This is uncomfortable for the driver. In examples disclosed herein, the functionality of the electronic steering system regarding the torque feedback for the driver of the vehicle can still be provided even in the event of an unexpected operating condition in the electronic steering system. This enhances the functionality of the electronic steering system and the comfort for the driver. In this way, other mechanisms to handle unexpected operating conditions, such as a reduction in the speed of the vehicle, can be avoided. In addition, three independent channels are provided at least for either the torque feedback and/or for steering the steerable road wheels. This ensures two-fold redundancy, so that the functionality of the electronic steering system can still be provided even in the event of multiple unexpected operating conditions.

According to a second aspect, some examples of the disclosure also relate to an electronic steering system for a vehicle. The electronic steering system comprises at least a first, a second and a third independent feedback channel and at least a first and a second independent steering channel or at least a first and a second independent feedback channel and at least a first, a second and a third independent steering channel. The feedback channels each have at least one feedback control device. Each steering channel has at least one steering control device.

The electronic steering system is configured for at least two feedback channels to detect a position and/or movement of the steerable road wheel of the vehicle or of the component coupled to it and/or a position and/or movement of a steering wheel of the vehicle.

The feedback control device is configured to determine a feedback torque based on the detected position and/or movement.

The electronic steering system is also configured to output a torque to a steering wheel or a component coupled to the steering wheel based on the determined feedback torque.

The electronic steering system is configured for each steering channel to detect a position and/or movement of the steering wheel or the component coupled to the steering wheel.

Each steering control device is configured to determine a torque request based on the detected position and/or movement.

The electronic steering system is configured for each steering channel to output a torque to a steerable road wheel or a component coupled to the steerable road wheel based on the determined torque request.

The advantages achieved by examples described herein are also achieved by the electronic steering system in a corresponding manner.

In general, each feedback channel is configured individually and independently of other feedback channels to provide a corresponding feedback torque for the vehicle driver on the steering wheel of the vehicle. This ensures that every single feedback channel provides sufficient feedback for the driver. This results in a high-availability operation of the electronic steering system, as the functionality of the torque feedback can be guaranteed individually through all feedback channels.

Alternatively or additionally, each steering channel is configured individually and independently of other steering channels to apply a corresponding torque to a steerable road wheel, to adjust the wheel angle of the steerable road wheel accordingly and, thus, enable lateral control of the vehicle. Each individual steering channel, thus, ensures adequate steering capability for the vehicle. This results in a high-availability operation of the electronic steering system, as the functionality of the vehicle steering can be provided individually through all steering channels.

In some examples, feedback channels and steering channels may at least partially comprise the same components such as, for example, bus structures for communication between different components.

In examples disclosed herein, unexpected operating condition, limited operating condition, unexpected operating state, and limited operating state may be used interchangeably to refer to a condition or a state of a component that is unavailable, inoperable, and/or operating outside of an operating specification performance range of the component.

An unexpected operating condition (e.g., a limited operating condition) in the electronic steering system can be caused, for example, by an unexpected operating condition that occurs with respect to a steering system component (e.g., a road wheel actuator or a feedback control device) and is detected or discovered, for example, by a sensor of the electronic steering system. An unexpected operating condition does not necessarily refer here to complete inoperability. The unexpected operating condition in the electronic steering system may also be such that the electronic steering system exhibits uncomfortable operation. For example, due to an unexpected operating condition (e.g., in the feedback control device), the electronic steering system may no longer be able to ensure a corresponding torque feedback to the driver, specifically in relation to the feedback channel within which the unexpected operating condition occurred. In addition, unexpected operating conditions can also occur such that functions performed by steering system components of the electronic steering system are outside a defined standard range. For example, sensors configured as steering system components may transmit measured values to the control device within a defined interval. However, if the measured value transmitted is outside the interval, an unexpected operating condition in the sensor (steering system component) can be assumed. This means that it is also possible to detect steering system components that may still be operable, albeit incorrectly, which ultimately cause an unexpected operating state in the electronic steering system.

Generally, the point is that a feedback channel (and/or a steering channel) of the electronic steering system can no longer be used reliably in the conventional operating mode to ensure vehicle lateral control and/or a torque feedback. This must be distinguished from inadequate vehicle lateral control due to external conditions such as, for example, in the event of high wheel slip due to icy road surfaces. In this sense, the vehicle can comprise a control device that detects an unexpected operating condition in the electronic steering system and, as a result of the detection or determination of the unexpected operating condition, restricts the electronic steering system to properly operating feedback channels and/or steering channels.

In some examples, the electronic steering system, if not present, has at least an additional third independent feedback channel or an additional third independent steering channel. In such examples, at least two-fold redundancy can be ensured with regard to feedback channels and steering channels, so that the functionality of the electronic steering system (if necessary, limited) can be provided even in the event of multiple unexpected operating conditions.

According to a third aspect, some examples of the disclosure also relate to a method for operating a vehicle with an electronic steering system. The electronic steering system comprises at least a first and a second independent feedback channel. Each feedback channel has at least one feedback control device. The method comprises at least the following operations for at least two feedback channels independently: a position and/or movement of the steerable road wheel of the vehicle or of the component coupled to the steerable road wheel and/or a position and/or movement of a steering wheel of the vehicle is detected; a feedback torque is determined by the feedback control device based on the detected position and/or movement; and a torque is output to the steering wheel or a component coupled to the steering wheel based on the determined feedback torque.

The advantages achieved by the method described above are also achieved in a corresponding manner by disclosed examples that provide redundancy with regard to the torque feedback.

According to a fourth aspect, some examples of the disclosure relate to an electronic steering system for a vehicle. The electronic steering system comprises at least a first and a second independent feedback channel. Each feedback channel has at least one feedback control device each. The electronic steering system is configured to detect a position and/or movement of the steerable road wheel of the vehicle or of the component coupled to the steerable road wheel and/or a position and/or movement of a steering wheel of the vehicle. Each feedback control device is configured to determine a feedback torque based on the detected position and/or movement. The electronic steering system is configured to output a torque to a steering wheel or a component coupled to the steering wheel based on the determined feedback torque.

The advantages achieved by examples described above are also achieved in a corresponding manner by the electronic steering system presented here, which in this example provides redundancy with regard to the torque feedback.

In some examples, the electronic steering system in the examples of the third and fourth aspect has a separate third feedback channel. The third feedback channel also has at least one separate feedback control device. This further increases the redundancy of the electronic steering system. For example, the electronic steering system can still operate even if it has unexpected operating conditions in two feedback channels.

In some examples, the electronic steering system in the examples of the third and fourth aspects has at least a first, a second and a third steering channel, each independent of one another. Each steering channel comprises one steering control device. The method comprises at least the following operations for each steering channel independently: a position and/or movement of the steering wheel or the component coupled to the steering wheel is detected; a torque request is determined by the steering control device based on the detected position and/or movement; and a torque is output to a steerable road wheel or a component coupled to the steerable road wheel based on the determined torque request.

This increases the versatility of the method and the electronic steering system. In addition to multiple feedback channels already provided, multiple separate steering channels can also be provided. This can cause a deflection of the steerable wheels of the vehicle based on corresponding steering instructions from the driver of the vehicle, so that a lateral control of the vehicle is ensured. This further increases the redundancy of the electronic steering system. For example, additional cases of unexpected operating conditions of the electronic steering system can be intercepted in such a way that the electronic steering system remains usable, also with regard to the steering of steerable road wheels. This increases the functionality of the electronic steering system.

The position and/or the movement of the steering wheel or the component coupled to it determines a steering input in the sense of steering information from the driver of the vehicle. Depending on the steering input, the steering control device then determines the corresponding torque request so that the steerable road wheels can be controlled in such a way that they follow the steering input and the lateral control of the vehicle is carried out as the driver intends.

In some examples, one of the feedback channels is passive. In such examples, torque is output to the steering wheel using an electric motor short circuit element, an electrical damping element, and/or a mechanical damping element. This means that the torque for the torque feedback to the driver can also be provided indirectly. This is particularly advantageous if torque feedback is no longer possible due to a steering wheel actuator in an unexpected operating state (e.g., a limited operating state). In such examples, it is not necessary to know the position and/or movement of the steerable road wheel and/or the position and/or movement of the steering wheel of the vehicle. This means that for a passive feedback channel, the first operation of the method according to the first and third aspects can be omitted.

In some examples, the torque output to the steering wheel is generated by a resistance torque by: short-circuiting windings of the electric motor coupled to the steering wheel using the electric motor short-circuit element; varying a resistance between the windings of the electric motor using the electrical damping element; and/or activating the mechanical damping element which is at least indirectly coupled to the steering wheel, thus causing additional mechanical friction.

The electric motor short-circuit element is configured to short-circuit windings of an electric motor of the steering wheel actuator. This creates an additional electrical resistance that propagates as a mechanical resistance to the mobility of the steering wheel.

The electrical damping element is configured to provide variable electrical resistance between windings of the electric motor of the steering wheel actuator. This creates an additional electrical resistance that propagates as a mechanical resistance to the mobility of the steering wheel.

The mechanical damping element (also called resistance or friction element) is configured to provide additional mechanical resistance to the mobility of the steering wheel. For this purpose, for example, a frictional coupling of the steering wheel or a component (e.g., a steering column) coupled to it can be created with a friction element. This also restricts the mobility of the steering wheel, enabling torque feedback to the driver.

As a result, the present method may be used to generate feedback torque for the driver of the vehicle either actively, for example, by the steering wheel actuator, or passively, by the aforementioned mechanisms. As a result, the feedback torque can be provided to the driver of the vehicle even if the steering wheel actuator is in an unexpected operating state. This further enhances the functionality of the methods and the underlying electronic steering systems disclosed herein.

The electric motor short-circuit element, the electrical damping element and the mechanical damping element may be dependent on an activation. This means that each element must first be activated so that the steering wheel or the component coupled to the steering wheel is acted upon with torque by the respective element to provide feedback to the driver.

A switching device may be provided for the activation of the aforementioned mechanisms. For example, the switching device may be closed when powered off. This means that as long as the electronic steering system is operating properly, a voltage can be applied to the switching device to ensure that the switching device is open. The aforementioned mechanisms are, thus, deactivated. If an unexpected operating condition in the steering wheel actuator is detected, for example by a sensor, the voltage applied to the switching device can be automatically interrupted or deactivated, which causes the switching device to close. This, in turn, leads to the activation of at least one of the aforementioned mechanisms, which can indirectly ensure a feedback torque for the driver of the vehicle. As a result, the comfort for the driver of the vehicle is increased, as even in the event of an unexpected operating condition in the steering wheel actuator, a corresponding feedback torque can be ensured, giving the driver a sensation of the lateral control of the vehicle.

In some examples, at least two feedback channels are active and comprise a steering wheel actuator through which they output the torque to the steering wheel. As a result, the torque feedback can be provided in a way that is very comfortable and precise for the driver.

In some examples, the steering wheel actuators of different feedback channels comprise respective independent winding sets within a single electric motor, which is at least indirectly coupled to the steering wheel of the vehicle. For example, only a single mechanical electric motor needs to be considered, but one that has mutually independent winding sets. For example, the winding sets can each have three windings for different current phases. Thus, the electric motor can have a six-phase or nine-phase design overall. This makes the electronic steering system particularly compact.

In some examples, the position and/or movement of the steerable road wheel of the vehicle is detected based on a road wheel sensor which is assigned to the respective feedback channel.

Alternatively or additionally, the position and/or movement of a steering wheel of the vehicle can be detected based on a steering wheel sensor which is assigned to the respective feedback channel.

This allows the positions and/or movements of the steerable road wheel or the steering wheel to be detected in a particularly precise and compact manner.

In some examples, road wheel actuators of different steering channels include independent winding sets within a single electric motor, which is at least indirectly coupled to a steerable road wheel of the vehicle. The advantages described above can also be achieved here, which makes the electronic steering system particularly compact.

Overall, only a single electric motor needs to be provided for coupling to the steering wheel and a single electric motor for coupling to a steerable road wheel. Thus, the electronic steering system advantageously has a low complexity.

In some examples, the feedback channel also has a road wheel actuator which is configured to vary a wheel angle of a steerable road wheel, at least indirectly. In such examples, the road wheel sensor may be coupled to the road wheel actuator and configured to detect the wheel angle of the steerable road wheel of the vehicle based on the position and/or the movement of the road wheel actuator.

In some examples, the steering channel additionally comprises a steering wheel actuator, which is configured to apply a torque to a steering wheel of the vehicle so that the driver is provided with torque feedback via the lateral control of the vehicle. In such examples, the steering wheel sensor may also be coupled to the steering wheel actuator and configured to detect a position and/or a movement of the steering wheel actuator, from which a steering input of the driver can be determined, for example, by the steering control device.

In some examples, steering wheel actuators and road wheel actuators can each be part of corresponding ones of a feedback channel and a steering channel. However, the different actuators are not simultaneously components of different feedback channels or steering channels.

In some examples, the feedback control device of a feedback channel can be implemented with the steering control device of a steering channel in a single control device. In such examples, the single control device can perform the control with respect to both the feedback channel and the steering channel. As a result, the integration of the electronic steering system is increased. The electronic steering system is then particularly compact.

Each road wheel actuator and each steering wheel actuator may have a gear system that is coupled to the respective electric motor. Each road wheel sensor and steering wheel sensor can then be coupled to the respective gear system. For example, an absolute position of the respective actuator of the respective road wheel sensor and/or steering wheel sensor can be detected by the fact that the respective sensor has a first partial sensor and a second partial sensor, wherein the different partial sensors are arranged on different sides of the gear system, for example, a reduction gearbox. The Vernier algorithm can then be used to determine the absolute position information via the respective actuator.

The ability to determine absolute position information for the respective actuator makes the sensor system of the electronic steering system robust against a power cycle with a sensor in an unexpected operating state (e.g., a limited operating state) in which the sensor is disconnected from the supply circuit. As a result, the absolute position information of the respective actuator can be determined again, even after disconnection from the supply circuit.

If different feedback channels and/or steering channels have a single steering wheel sensor and separate road wheel sensors, the electronic steering system is also redundant in terms of the sensor system. For example, in some examples, two road wheel sensors may even be in an unexpected operating state. In such examples, the information about the position of the road wheel actuator and/or the steerable wheels coupled to it that is used for the torque feedback can still be detected and determined, namely based on an additional third road wheel sensor. This increases the integrity of the electronic steering system.

In some examples, feedback channels and/or steering channels may have road wheel sensors which are configured to detect a position and/or movement (wheel angle) of a steerable road wheel of the vehicle.

In some examples, feedback channels and/or steering channels may have steering wheel sensors which are configured to detect a position and/or movement (steering wheel angle) of a steering wheel of the vehicle.

While the vehicle is driving, the absolute position of an actuator can be advantageously determined and continuously detected based on relative position information. For this purpose, for example, the motor angle of the underlying electric motor can be taken into account. This provides a high level of robustness during the driving cycle of the vehicle in relation to a malfunction in the sensor system (e.g., of a road wheel sensor or steering wheel sensor).

In some examples, at least two steering channels are active. In such examples, the steering channels have corresponding road wheel actuators which are configured to apply a torque to steerable road wheels of the vehicle in such a way that an orientation (e.g., a wheel angle) of the steerable road wheels is varied. This enables direct lateral control of the vehicle.

In some examples, at least one steering channel may be passive. The passive steering channel may be configured to allow only indirect vehicle lateral control based on an auxiliary steering system. This means that the steering channel can be configured to output different torques to different road wheels, for example, in which drive units and/or deceleration devices are used to provide the drive/deceleration of the vehicle. In such examples, the passive steering channel does not need to have a road wheel actuator. Rather, in such examples, the vehicle lateral control is enabled via a tertiary lateral control system (TLC). Different wheel-specific torques of the multiple drive units and/or deceleration devices are then generated. This causes different rotation speeds of the different road wheels of the vehicle, which results in vehicle lateral control. As a result, the lateral control of the vehicle can be provided even if, for example, a road wheel actuator is in an unexpected operating state (e.g., a limited operating state). In some examples, the passive steering channel does not need to have a road wheel actuator.

In some examples, in the event of an unexpected operating condition in a feedback channel, an unexpected operating state notification is issued to the driver of the vehicle. For example, the vehicle may have a corresponding output device such as, for example, a multimedia device with a display or similar, through which a corresponding notification for the driver of the vehicle can be provided. This can alert the driver of the vehicle that vehicle maintenance is required.

In some examples, in the event of an unexpected operating state of a steering channel, a notification of the unexpected operating condition is also issued to the driver of the vehicle. The previous explanations apply mutatis mutandis.

In some examples, the electronic steering system comprises a system control device. The system control device is configured to monitor feedback channels and steering channels with regard to unexpected operating conditions occurring and/or to detect corresponding unexpected operating conditions of components of the respective channels. The system control device can also be external to the electronic steering system, and can be implemented, for example, by a higher-level driver control device of the vehicle. As a result of the detection of an unexpected operating condition in a feedback channel and/or a steering channel or a component thereof, the system control device can trigger the output of an unexpected operating state notification to the driver. This further enhances the functionality of the electronic steering system.

In some examples, in the event of an unexpected operating condition in two identical channels, in particular two feedback channels, or components thereof, a series of unexpected operating state notifications (e.g., notifications of unexpected operating conditions) with increasing relevance are output to the driver of the vehicle. The increasing relevance of the notifications in the corresponding series can be manifested, for example, in that the corresponding notifications are more strongly emphasized along the series. For example, the notifications may be increased in size along the series, or may be displayed to the driver of the vehicle over longer periods of time. In some examples, the notifications may also have additional notification sub-signals, for example, sounds that are output through a speaker. Alternatively or additionally, the notifications can also be issued along the series with different parts of the output devices of the vehicle, so that they are displayed more prominently in the driver's usual field of vision with increasing relevance, for example, in the usual position of the vehicle displays, such as a speed indicator. If two similar channels, for example, two feedback channels, become inoperable or unavailable, then only one single channel of the corresponding type remains. In such examples, it is highly relevant that the driver rapidly steers the vehicle into a suitable parking position to prevent the third channel of the corresponding type from also becoming inoperable or unavailable, in which case the corresponding functionality of the electronic steering system, for example the torque feedback, can no longer be provided at all. In this context, the series of notifications with increasing relevance ensures that the driver of the vehicle understands the importance of the notifications and complies with the appropriate instructions. In this way, operating situations in which individual functionalities of the electronic steering system can no longer be provided can be reliably prevented.

In some examples, a series of notifications of an unexpected operating condition with increasing relevance is also provided in the event of unexpected operating conditions of two identical steering channels or components thereof.

In some examples, the speed of the vehicle is reduced below a series of speed thresholds if the speed of the vehicle is greater than the respective speed threshold value after predefined periods of time. This can force a reduction in vehicle speed, for example, if the driver does not steer the vehicle into a suitable parking place, even though unexpected operating conditions have occurred in the electronic steering system. In this way, unsuitable driving situations of the vehicle with regard to the electronic steering system can generally be avoided. However, this example advantageously also prevents the speed of the vehicle having to be reduced immediately to a minimum speed, for example, a crawling speed, after a single unexpected operating condition occurs in connection with the electronic steering system. Therefore, the functionality of the vehicle can be guaranteed over a larger parameter space compared to previous approaches.

In particular, the application of the series of speed thresholds and the corresponding reduction of the speed of the vehicle after predefined periods of time can be triggered and applied as a result of unexpected operating conditions occurring in the electronic steering system, for example, by the system control device of the electronic steering system. The corresponding speed thresholds may depend in particular on the type or the number of unexpected operating conditions that have occurred in connection with single or multiple channels of the electronic steering system. The system control device of the electronic steering system may be configured to select and set the speed thresholds accordingly. This further enhances the functionality of the electronic steering system.

In some examples, a first speed threshold value may be selected such that the vehicle is still able to drive at a low speed, for example, to reach a garage.

In some examples, a second speed threshold value may be selected such that only a crawling speed of the vehicle is enabled, for example, to be able to reach the nearest parking facility. This means that the second speed threshold can be lower than the first speed threshold.

In some examples, the first speed threshold can be applied if only a single unexpected operating condition occurs within the electronic steering system with respect to a single channel or a component thereof, such as a feedback channel. In such examples, the second speed threshold value can be subsequently applied if an additional unexpected operating condition occurs within the electronic steering system with respect to an identical second channel or a component thereof, for example, another feedback channel. Thus, such examples enable appropriate measures to be taken for the vehicle automatically such as, for example, a reduction in the vehicle speed depending on the unexpected operating conditions that have occurred.

In some examples, disclosed examples are configured as computer-implemented methods. This means that operations of the disclosed examples can be supported by one or more data processing devices. In particular, a data processing device can trigger or perform the appropriate operations. For example, a data processing device of the feedback control device can control the road wheel sensor in such a way that it detects a position and/or a movement of the steerable road wheel of the vehicle or the component coupled to it, can determine the feedback torque and output an actuating signal for the steering wheel actuator, to ensure that this outputs a torque corresponding to the feedback torque to the steering wheel or to a component connected to it.

According to a further aspect, the disclosure also relates to a computer program comprising commands which, when the program is executed by a computer, cause the computer to execute examples described herein. The advantages achieved by the examples described herein are also achieved by the computer program product in a corresponding manner.

According to an additional aspect, the disclosure also relates to a computer-readable storage medium comprising commands which, when the program is executed by a computer, cause the computer to execute examples described herein. The advantages achieved by the examples described herein are also achieved by the computer-readable storage medium in a corresponding manner.

According to an additional aspect, some examples of the disclosure also relate to a vehicle with an electronic steering system. The advantages achieved by examples described herein are also achieved by the vehicle in a corresponding manner.

For the purposes of the disclosure, vehicles may include, in particular, land vehicles, including, but not limited to, off-road and road vehicles such as passenger cars, buses, trucks and other utility vehicles. Vehicles may be manned or unmanned. Vehicles may be at least partially electrically driven, have an internal combustion engine and/or an electric motor serving as the drive.

All the features explained with regard to the various aspects can be combined individually or in (sub) combination with other aspects.

The disclosure as well as other advantageous examples and refinements thereof are described and explained in more detail below with reference to the examples shown in the drawings.

The following detailed description in conjunction with the accompanying drawings, in which identical numbers refer to identical elements, is intended to describe different examples of the disclosed subject matter and is not intended to represent the only examples. Each example described in this disclosure is an example or intended for illustration purposes only and should not be interpreted as preferred or advantageous over other examples. The illustrative examples contained herein do not claim to be complete and do not limit the claimed subject-matter to the exact disclosed forms. Different variations of the examples described and the general principles defined herein may be applied to other examples and applications without departing from the spirit and scope of the examples described. Therefore, the examples described are not limited to the examples shown, but have the widest possible scope compatible with the principles and features disclosed herein.

All the features disclosed below with respect to the examples and/or the accompanying figures may be combined alone or in any subcombination with features of the aspects of the disclosure.

For the purposes of the disclosure, the wording "at least one of A, B and C" means, for example, (A), (B), (C), (A and B), (A and C), (B and C) or (A, B and C), including any other possible combinations if more than three items are listed. In other words, the term "at least one of A and B" in general means "A and/or B", namely "A" alone, "B" alone or "A and B".

FIG. 1 shows a vehicle 10 having an electronic steering system 12 in accordance with examples disclosed herein.

The vehicle 10 also comprises steerable road wheels 14. The steerable road wheels 14 are coupled to a steering rack 16. The steering rack 16 can be moved from a reference position, for example, a zero position, which causes a steering movement of the steerable road wheels 14. Thus, the steerable road wheels 14 can be deflected, for example, from a straight-ahead orientation of the vehicle 10, so that the vehicle 10 performs a cornering maneuver.

For the movement of the steering rack 16, the electronic steering system 12 has a road wheel actuator 18. In the present case, the road wheel actuator 18 is coupled to the steering rack 16. Alternatively, the road wheel actuator 18 may also be coupled to the steerable road wheels 14 in a different way to control their alignment.

According to the example of FIG. 1, the road wheel actuator 18 has an electric motor 20. The electric motor 20 has a plurality of winding sets 22 shown as three in the illustrated example. Each winding set 22 includes a group of windings. Each winding set 22 is configured so that when supply signals such as phase voltages are applied, phase currents arise in the underlying windings, which can be used to drive a rotor of the electric motor 20. The rotor can then be coupled to the steering rack 16 and, thus, enable the movement of the steering rack 16.

In general, the electric motor 20 may also have more than three winding sets 22.

Typically, each winding set 22 is three-phase, so that the electric motor 20 has a total of nine phases.

The winding sets 22 enable the rotor of the electric motor 20 to move independently of other winding sets 22. This means that the winding sets 22 are separate from one another.

The road wheel actuator 18 also comprises road wheel sensors 24. In the present case, the road wheel actuator 18 has three road wheel sensors 24. The road wheel sensors 24 are also separate from one another and configured to detect a position and/or a movement of the steerable road wheels 14 or a component (e.g., the steering rack 16) coupled thereto independently of other road wheel sensors 24. The detection of the position of the steering rack 16 allows the wheel angle of the steerable road wheels 14 to be determined. Thus, the alignment of the steerable road wheels 14 can be determined.

The electronic steering system 12 of the vehicle 10 also comprises a plurality of feedback control devices 26. The feedback control devices 26 are coupled to the road wheel actuator 18. In each case, a single feedback control device 26 is coupled to a single road wheel sensor 24.

Even if the road wheel sensors 24 are formed here as part of the road wheel actuator 18, the road wheel sensors 24 can alternatively be arranged separately from the road wheel actuator 18 and still be configured to detect a position and/or a movement of the steerable road wheels 14 of the vehicle 10. For example, the road wheel sensors 24 may be coupled to the steering rack 16 separately from the road wheel actuator 18.

The electronic steering system 12 of the vehicle 10 also has a steering wheel 30. Using the steering wheel 30, a driver of the vehicle 10 can activate steering inputs for the vehicle 10 to steer the vehicle 10 in a desired direction.

A steering wheel actuator 32 of the electronic steering system 12 is coupled to the steering wheel 30. The steering wheel actuator 32 has an additional electric motor 34. The electric motor 34 of the steering wheel actuator 32 also comprises a plurality of winding sets 22. The winding sets 22 of the electric motor 34 of the steering wheel actuator 32 are configured in a corresponding manner to the winding sets 22 of the electric motor 20 of the road wheel actuator 18. This means that each winding set 22 of the electric motor 34 is configured separately from the other winding sets 22 to drive a rotor of the electric motor 34. As a result, the steering wheel 30 of the vehicle 10 can be acted upon by a torque from the electric motor 34, which represents a feedback torque for the driver to impart a sensation of the lateral control of the vehicle 10 to the driver.

The electric motor 34 of the steering wheel actuator 32 in the present case also has three winding sets 22 and, therefore, has nine phases.

The electronic steering system 12 also has steering wheel sensors 36, which are part of the steering wheel actuator 32. In the present case, the steering wheel actuator 32 has three steering wheel sensors 36. Each steering wheel sensor 36 is configured independently of the other steering wheel sensors 36 to detect a steering input of the driver based on a steering wheel angle of the steering wheel 30 relative to a reference position.

Alternatively, the steering wheel sensors 36 may also be separate from the steering wheel actuator 32 and still be configured to detect a position and/or a movement of the steering wheel of the vehicle 10.

The electronic steering system 12 additionally comprises a plurality of steering control devices 38. The steering control devices 38 are configured independently of one another. Each individual steering control device 38 is coupled to a single steering wheel sensor 36.

In such examples, the electronic steering system 12 has individual feedback channels 28, which comprise at least one respective feedback control device 26. According to this example, all feedback channels 28 are active and also each includes a winding set 22 of the steering wheel actuator 32 and additionally, in some examples, a road wheel sensor 24. This means that the electronic steering system 12 has three parallel feedback channels 28 in such examples. Each feedback channel 28 is configured to detect a position and/or movement of a steerable road wheel 14 of the vehicle 10, to determine a feedback torque based on these and to apply a corresponding torque to the steering wheel 30 of the vehicle 10 based on the steering wheel actuator 32.

Alternatively, the feedback channels 28 may also have steering wheel sensors 36, which are configured to detect a position and/or movement of a steering wheel 30 of the vehicle 10.

Figure 7:
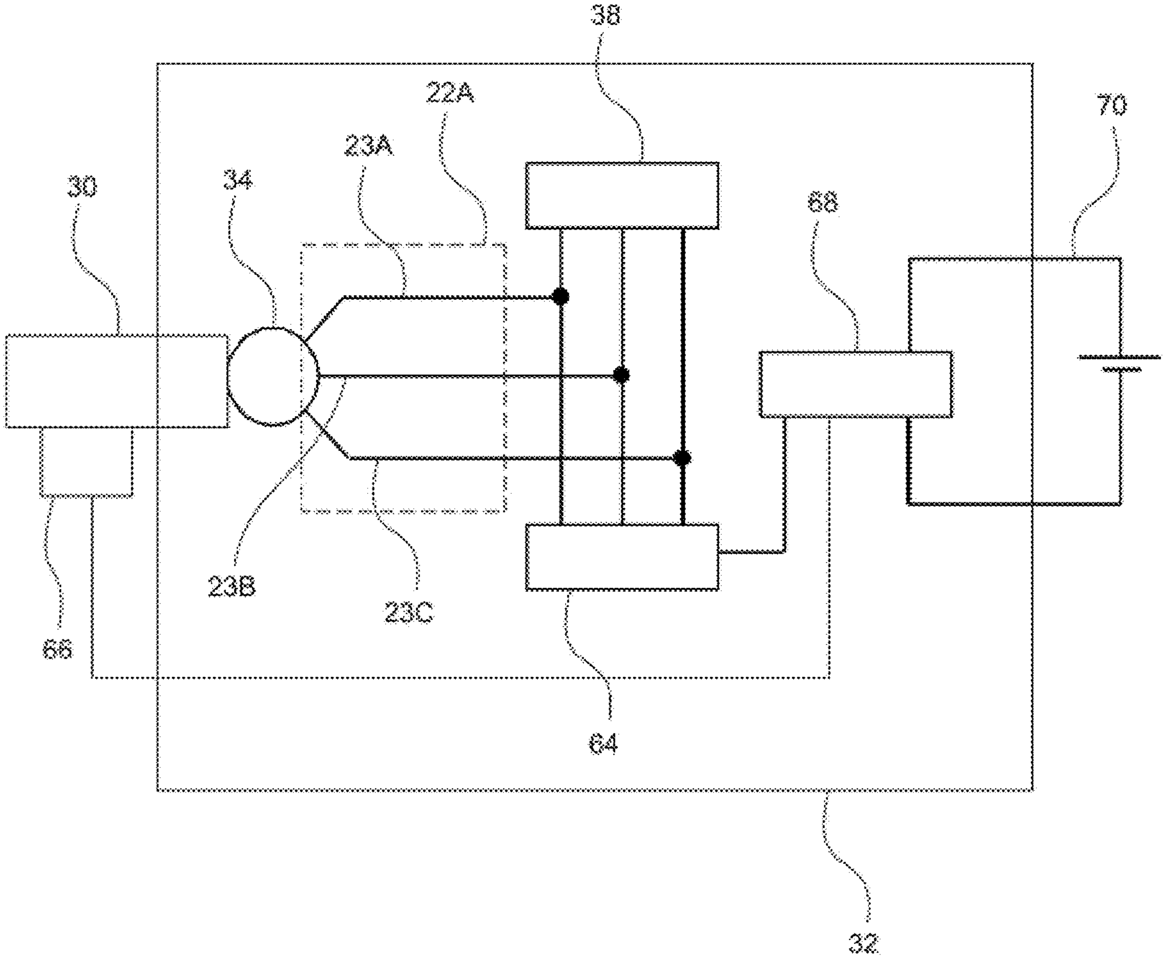
FIG. 7 shows a schematic drawing of a steering wheel actuator in accordance with examples disclosed herein.

In a further alternative, at least one feedback channel 28 can also be passive to produce a torque for the steering wheel 30 of the vehicle indirectly instead of through a steering wheel actuator 32, namely based on an electric motor short-circuit element, an electrical damping element 64 and/or a mechanical damping element 66 (see FIG. 7).

Figure 3:
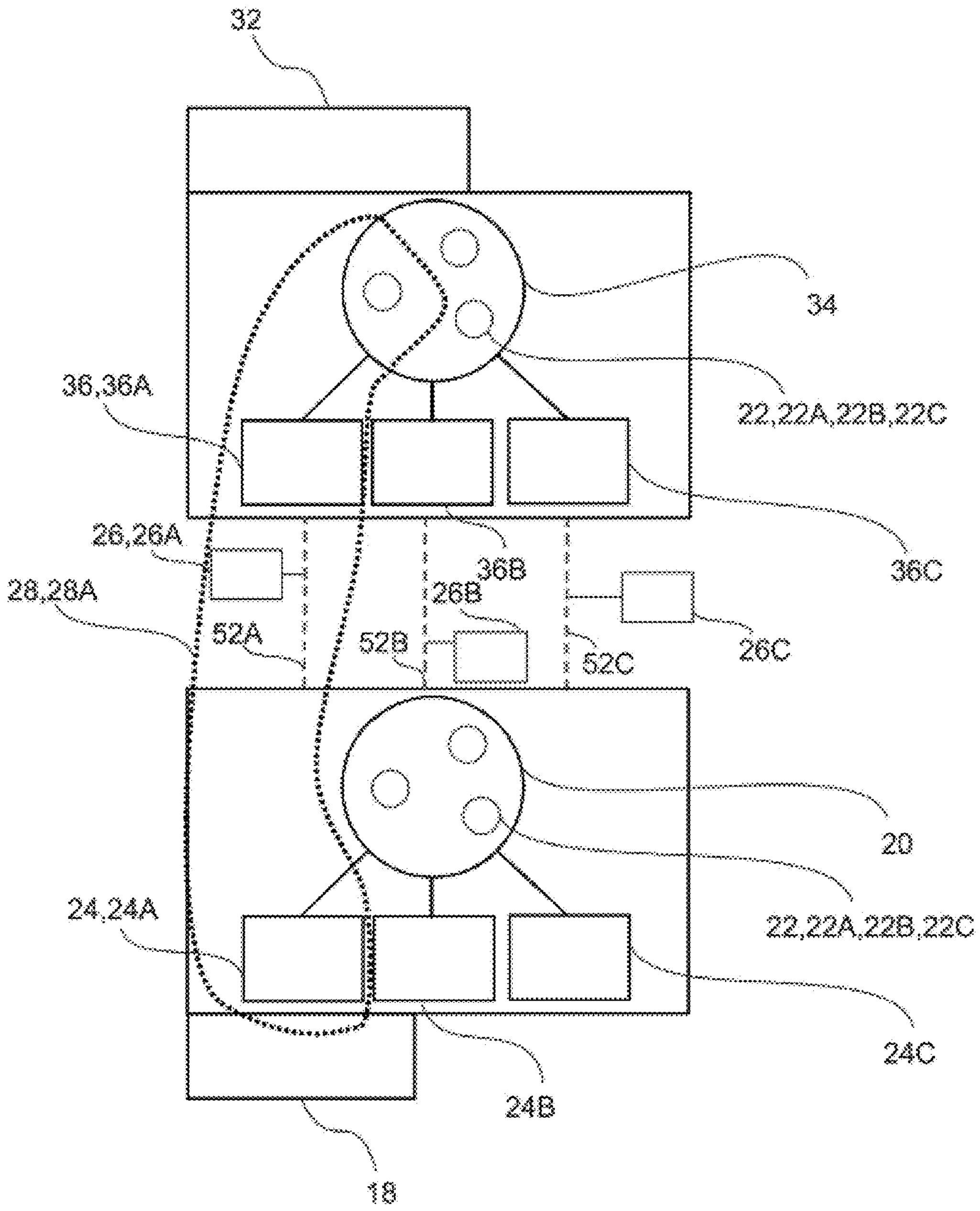
FIGS. 3 to 5 show schematic representations of an example electronic steering system according to examples disclosed herein.

FIG. 3 shows a schematic representation of an electronic steering system 12 according to some examples. FIG. 3 illustrates an example of which components can be involved in a single feedback channel 28A of the feedback channels 28. Even if this is not shown in FIG. 1, separate communication structures, such as bus structures 52, 52A, 52B, 52C, may also be provided for the individual feedback channels 28, 28A, 28B, 28C.

In addition, the example of FIG. 3 shows that each feedback channel 28 can comprise a single separate winding set 22, 22A, 22B, 22C of the respective electric motor 20, 34, provided these are active feedback channels 28. The feedback control devices 26, 26A, 26B, 26C are also separate for the respective feedback channels 28. In addition, the steering wheel sensors 36, 36A, 36B, 36C and the road wheel sensors 24, 24A, 24B, 24C are separately part of different feedback channels 28 or steering channels 40 (FIG. 1).

In addition, the electronic steering system 12 has different steering channels 40, which have at least one respective steering control device 38. In addition, the steering channels 40 can also each have a winding set 22 of the road wheel actuator 18 and, in some examples, a steering wheel sensor 36. According to this example, the electronic steering system 12, therefore, comprises three parallel configured steering channels 40. Each steering channel 40 is generally configured to detect a position and/or movement of the steering wheel 30 of the vehicle 10, to determine a steering input of the driver based on the detected position and/or movement, and to apply a torque to the steerable road wheels 14 according to the steering input via the road wheel actuator 18, so that the vehicle 10 is steered in the desired direction.

According to the example of FIG. 1, the electronic steering system 12 also has a system control device 42, which has at least one data processing device 44. In the illustrated example, the system control device 42 is configured as a link between the feedback control devices 26 and the steering control devices 38. In some examples, the electronic steering system 12 does not include a system control device 42.

In the illustrated example, the system control device 42 is configured to monitor the various components of the electronic steering system 12 for unexpected operating conditions. In addition, the system control device 42 of the illustrated example is configured to output a notification to the driver of the vehicle 10 via an output device 46, for example, a multimedia display, coupled to the system control device 42. For example, the driver of the vehicle 10 can, thus, be informed about unexpected operating states of the electronic steering system 12.

The monitoring for unexpected operating conditions can alternatively be performed by a different control device of the vehicle 10, for example, a higher-level driving control device 48, which is generally used for driving the vehicle 10.

Figure 2A:
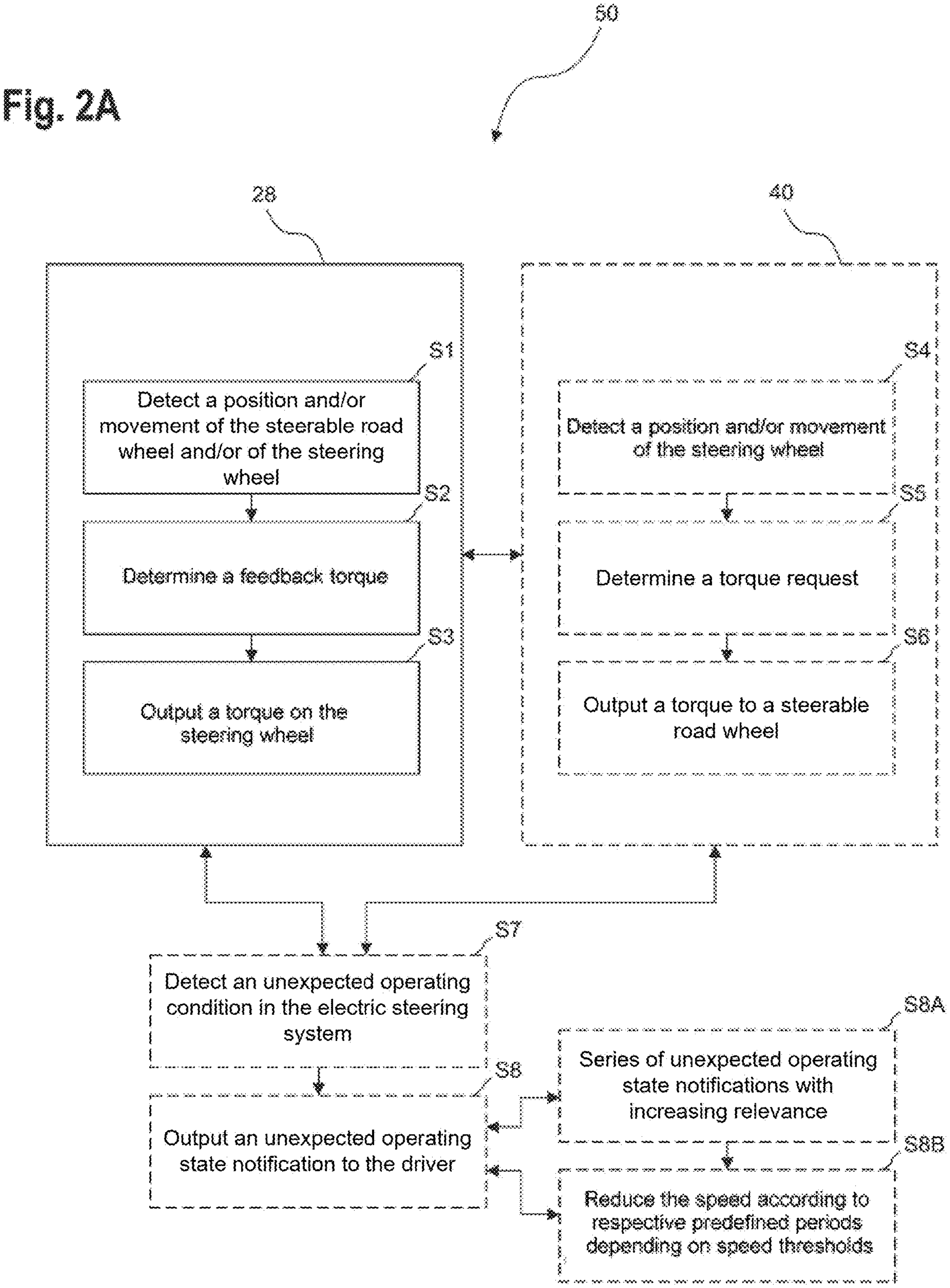
FIGS. 2A to 2C show flowcharts representative of example machine-readable instructions and/or example operations that may be executed, instantiated, and/or performed by example programmable circuitry to operate a vehicle with an electronic steering system in accordance with examples disclosed herein.
Figure 2B:
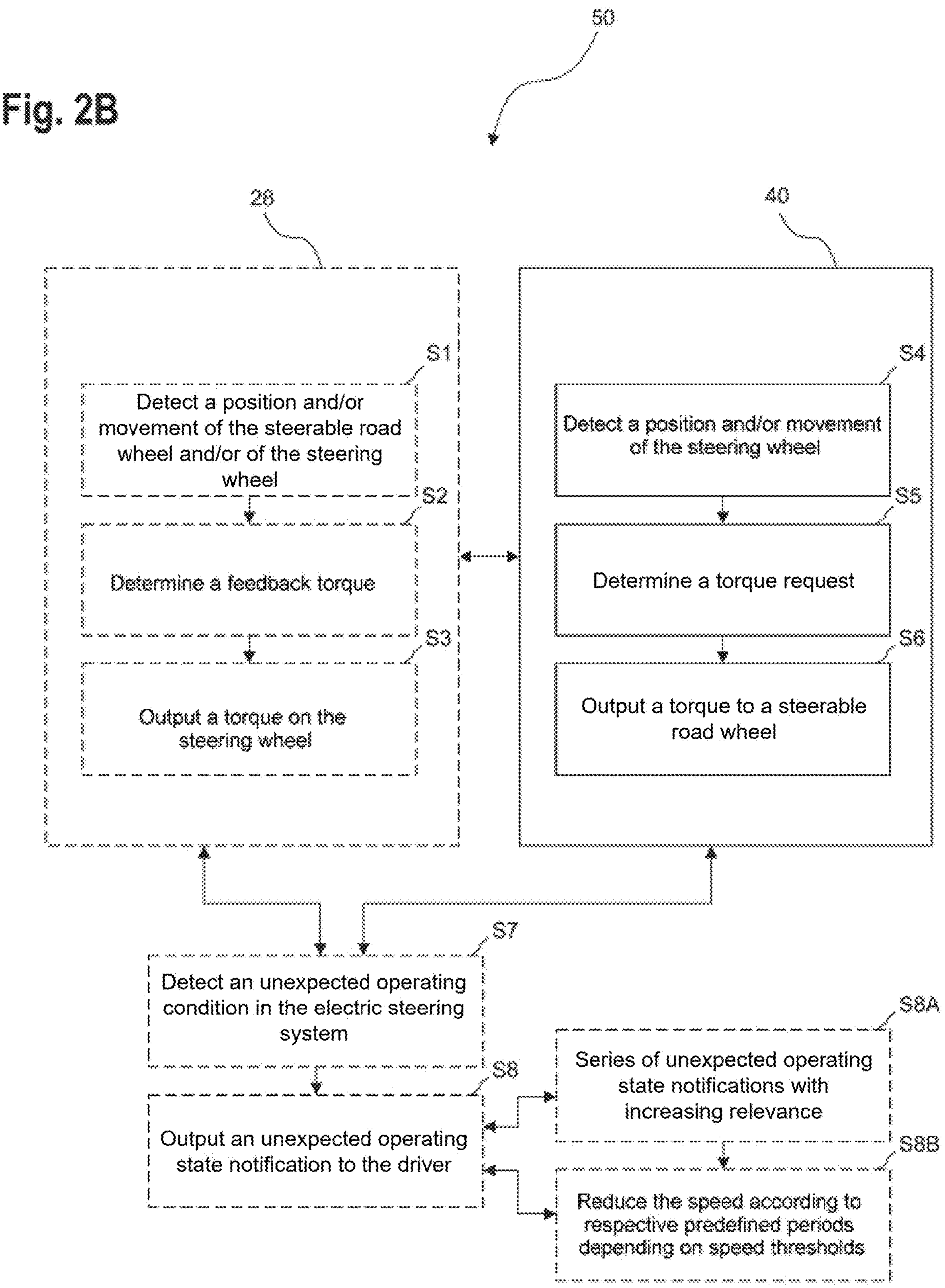
Figure 2C:
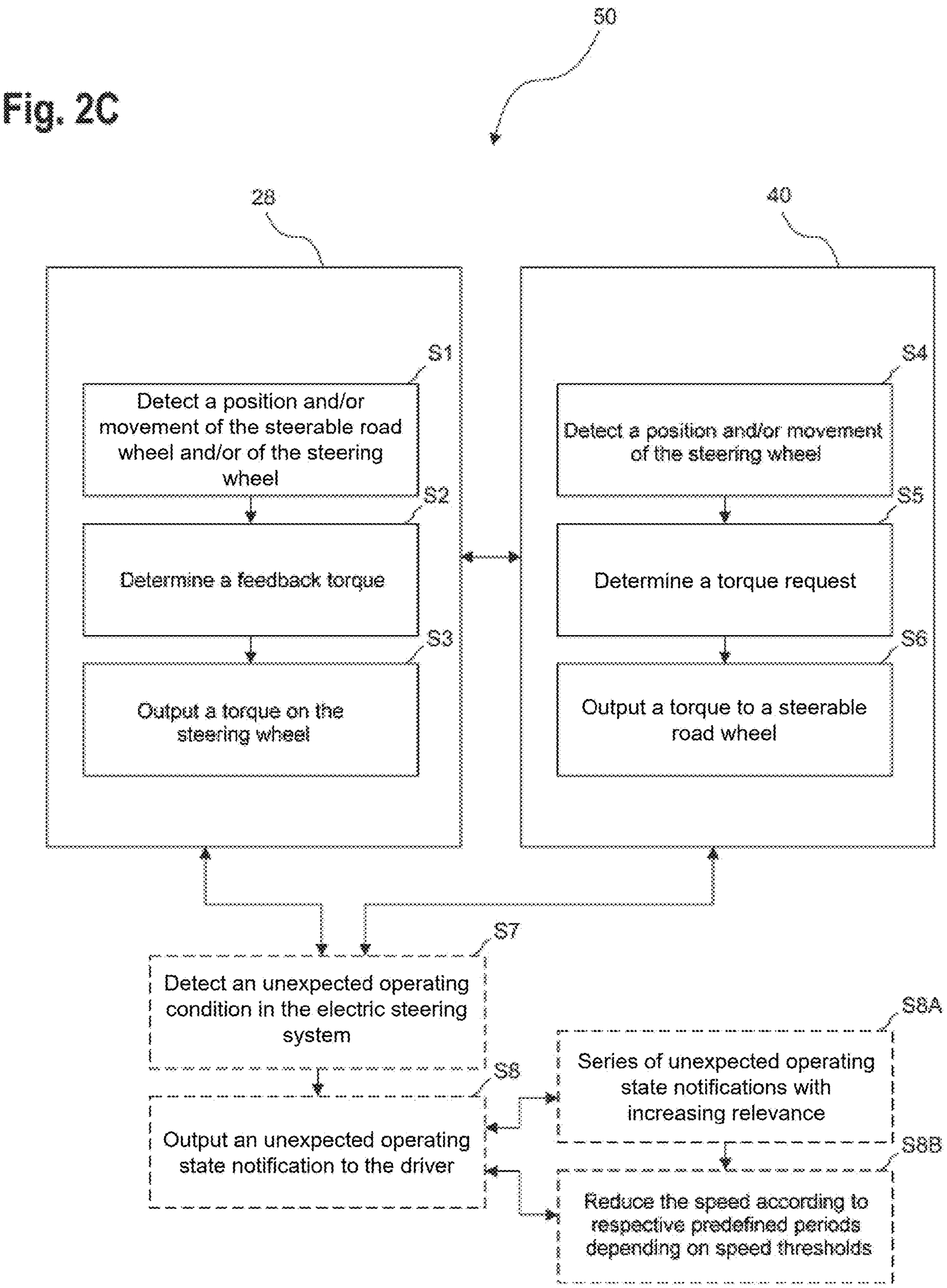

FIGS. 2A to 2C show flowcharts representative of example machine-readable instructions and/or example operations that may be executed, instantiated, and/or performed by example programmable circuitry to implement a method 50 of operating a vehicle 10 with an electronic steering system 12. In some examples, one or more operations shown by dashed lines may be omitted.

The different examples of the method 50 differ with regard to the existing feedback channels 28 and steering channels 40.

According to the example of FIG. 2A, the method 50 is based on at least two feedback channels 28. Steering channels 40 and/or a third feedback channel 28C may be additionally provided in this example.

According to the example of FIG. 2B, the method 50 is based on at least two steering channels 40. Feedback channels 28 and/or a third steering channel 40C may be additionally provided in this example.

According to the example of FIG. 2C, the method 50 is based on at least two feedback channels 28 and two steering channels 40. A third feedback channel 28C and/or a third steering channel 40C may be additionally provided in this example.

The following statements with regard to the method 50 refer to all examples of FIGS. 2A to 2C.

Each of the two feedback channels 28 is configured to perform at least the operations S1 to S3. In some examples, a third feedback channel 28C may be provided and configured differently. For example, the third feedback channel 28C may be passive, so that operation S1 may be omitted.

Each of the steering channels 40 is configured to perform at least the operations S4 to S6.

According to the operation S1 (in some examples, according to the configuration of feedback channels 28 and/or steering channels 40), a position and/or movement of the steerable road wheel 14 of the vehicle 10 or of the component coupled to the steerable road wheel 14 and/or a position and/or movement of a steering wheel 30 of the vehicle 10 is detected. For example, such positions and/or movements can be detected using a road wheel sensor 24 and/or a steering wheel sensor 36. With regard to the steering angle of the steerable road wheels 14, a position and/or movement of the steerable road wheel 14 can be detected based on the steering rack 16, because the steering rack 16 is coupled to the steerable road wheels 14 and a change in the wheel angle of the steerable road wheels 14 directly requires a movement of the steering rack 16.

In the following operation S2 (in some examples, according to the configuration of feedback channels 28 and/or steering channels 40), a feedback torque is determined by the feedback control device 26 based on the detected position and/or movement. This means that the feedback control device 26 of the respective feedback channel 28 determines, based on the detected position of the steering rack 16, what torque is to be applied to the steering wheel 30 of the vehicle 10 to give the driver of the vehicle 10 appropriate feedback about the lateral control of the vehicle 10.

Then, in operation S3 (in some examples, according to the configuration of feedback channels 28 and/or steering channels 40), a torque is output to the steering wheel 30 or a component coupled to the steering wheel 30 based on the determined feedback torque. For example, the steering wheel actuator 32 of the respective (active) feedback channel 28 can be used for this purpose. For this purpose, the respective feedback control devices 26 of the corresponding feedback channels 28 can directly control the winding sets 22 of the electric motor 34 of the steering wheel actuator 32 to, for example, apply phase voltages to them, or alternatively can output corresponding actuating signals to the steering control devices 38, which then control the winding sets 22 accordingly.

Alternatively, for at least one (passive) feedback channel 28, an electric motor short-circuit element, an electrical damping element 64 and/or a mechanical damping element 66 can be used to indirectly apply a torque to the steering wheel.

As a result, the method 50 allows feedback to the driver of the vehicle 10 via mutually independent feedback channels 28. This means that if an unexpected operating condition occurs in a particular feedback channel 28, the other feedback channels 28 can still ensure continuous feedback to the driver of the vehicle 10.

For example, the electronic steering system 12 may have at least two feedback channels 28, and, in some examples, three feedback channels 28.

As part of a steering channel 40 in some examples, the method 50 may comprise operation S4 (in some examples, according to the configuration of feedback channels 28 and/or steering channels 40), in which a position and/or movement of the steering wheel 30 or the component coupled to it is detected, for example via a steering wheel sensor 36.

In the following operation S5 (in some examples, according to the configuration of feedback channels 28 and/or steering channels 40), a torque request can then be determined by a steering control device 38 coupled to the steering wheel sensor 36 based on the detected position and/or movement of the steering wheel 30. In other words, the steering control device 38 determines which steering input the driver implements on the steering wheel 30 and then determines the torque to be applied to the steerable road wheels 14 of the vehicle 10 in order that the steering input of the driver is complied with.

In the following operation S6 (in some examples, according to the configuration of feedback channels 28 and/or steering channels 40) of the steering channel 40, a torque is output to a steerable road wheel 14 or a component coupled to the steerable road wheel 14, based on the determined torque request, in the case of active steering channels, for example, via the road wheel actuator 18. For this purpose, the steering control device 38 can be directly coupled to the winding sets 22 of the electric motor 20 of the road wheel actuator 18. Alternatively, the steering control devices 38 can also output a corresponding actuating signal to a respective feedback control device 26, which subsequently regulates a winding set 22 of the electric motor 20 of the road wheel actuator 18 accordingly. For a passive steering channel 40, for example, a tertiary lateral control (auxiliary steering) can be used.

Thus, the method 50 can ensure that the steerable road wheels 14 of the vehicle 10 are aligned according to the steering input of the driver.

Figure 4:
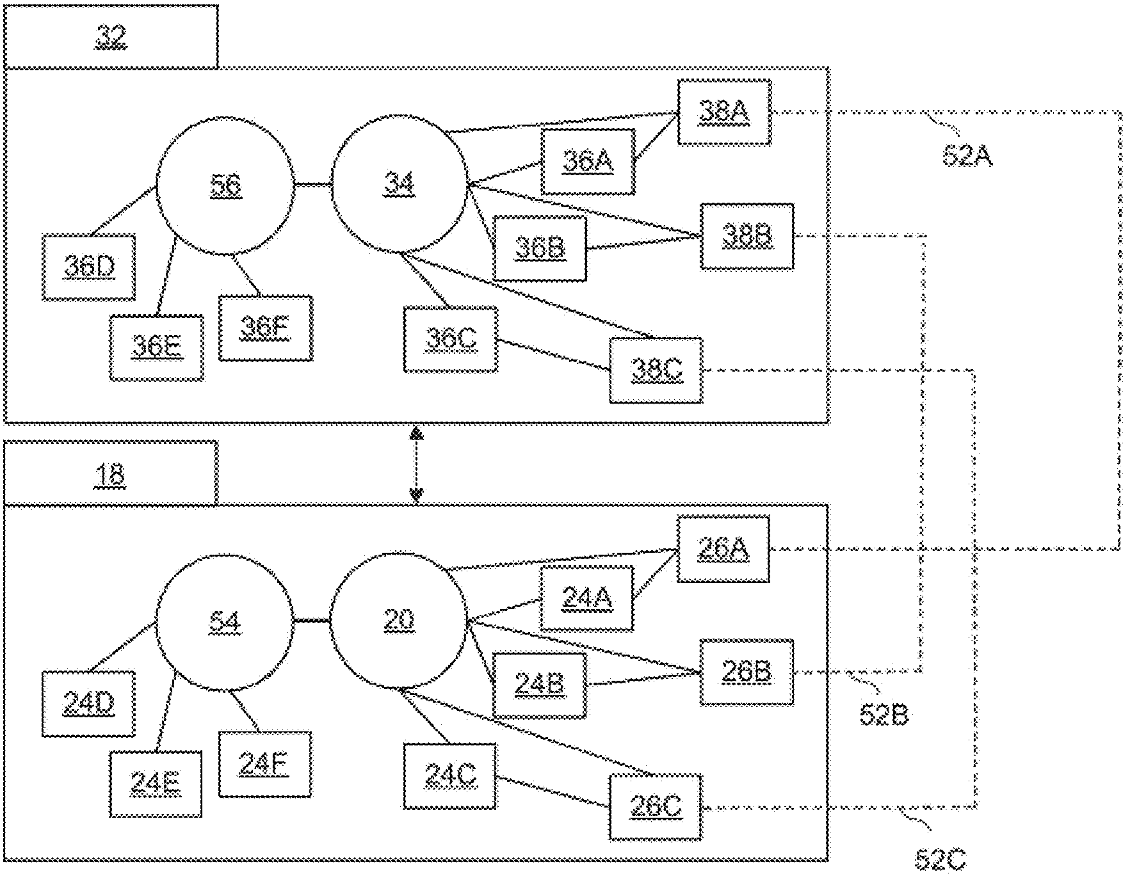

FIG. 4 shows a schematic representation of an electronic steering system 12 according to examples disclosed herein. The example of FIG. 4 shows that the electric motor 20 of the road wheel actuator 18 can also be coupled to a gear system 54. This allows the gear ratio to be adjusted, for example, at the output of the electric motor 20. In such examples, the corresponding road wheel sensors 24 can have partial sensors 24D, 24E, 24F so that corresponding partial sensors of the road wheel sensors 24 are arranged downstream and upstream of the gear system 54 of the road wheel actuator 18. As a result, each road wheel sensor 24, which is formed by a pair of partial sensors, may be configured to acquire absolute position information with respect to the electric motor 20. This increases the precision in determining the position and/or the movement of the steerable road wheels 14 of the vehicle 10.

The electric motor 34 of the steering wheel actuator can also be coupled to a gear system 56, so that the gear ratio at the output of the electric motor 34 can be adjusted. The steering wheel sensors 36 can also have corresponding partial sensors 36D, 36E, 36F, so that absolute position information with respect to the electric motor 34 of the steering wheel actuator 32 can also be detected.

In some examples, the method 50 can also be extended by the operations S7, S8, S8A, and/or S8B. These operations can be executed, for example, by a higher-level driving control device 48 of the vehicle 10. Here, the operations mentioned are carried out, for example, by a system control device 42 of the electronic steering system 12.

Figure 5:
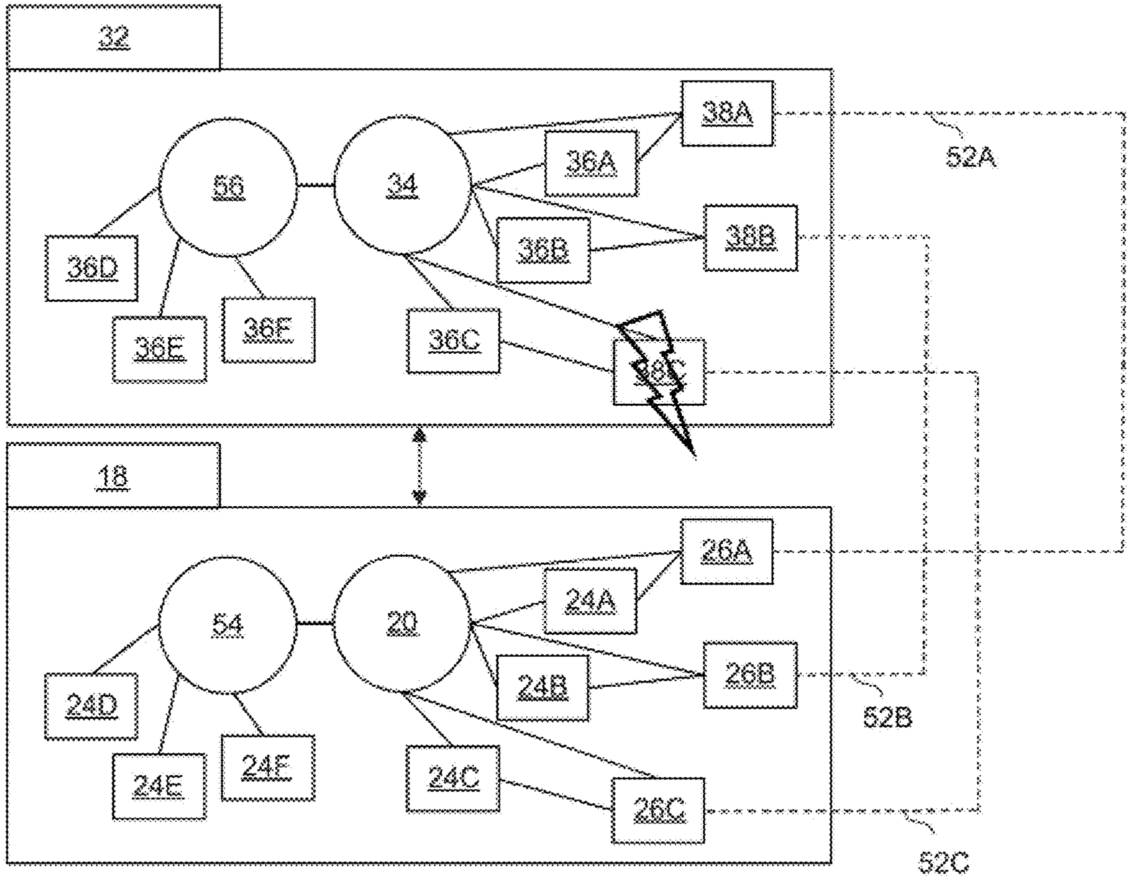

An unexpected operating condition in the electronic steering system 12 is detected in accordance with operation S7. For example, the system control device 42 of the electronic steering system 12 may be configured to detect that a particular feedback control device 26 is no longer operating properly. FIG. 5 shows a schematic representation of an electronic steering system 12 according to examples disclosed herein. In the example of FIG. 5, an unexpected operating condition occurs in connection with the steering control device 38C. As a result, a single steering channel 40 of the electronic steering system 12 is in an unexpected operating condition. In the illustrated example, this means that the electronic steering system 12 then has another three separate feedback channels 28, but now only two separate steering channels 40. However, the respective feedback channels 28 and steering channels 40 respectively ensure the functionality of the electronic steering system 12 with regard to the torque feedback and the steering of the steerable road wheels 14. As such, the electronic steering system 12 can continue to be used due to the redundancy provided.

As a result, according to operation S8, an unexpected operating state notification (e.g., a notification of an unexpected operating condition) can be output to the driver of the vehicle 10, for example, via the output device 46. Thus, the driver can be informed of the presence of an unexpected operating condition in the electronic steering system 12 to induce the driver to park the vehicle 10 in a suitable parking position.

In some examples, operation S8 can be extended by at least one of the operations S8A, S8B.

According to operation S8A, a series of unexpected operating state notifications with increasing relevance is output to the driver of the vehicle 10 if a plurality of identical channels of the electronic steering system 12 exhibits an unexpected operating condition, for example, multiple feedback channels 28 or multiple steering channels 40. The increasing relevance of notifications can be manifested in the fact that the notifications in the series are shown with larger dimensions, have additional signal components such as noise signals, or additional effects such as blinking. This increases the likelihood that the driver will take note of the notification and comply with it. As a result, this increases the likelihood that the driver will park the vehicle 10 in a suitable parking position.

Operation S8 can also be extended by operation S8B, in which the speed of the vehicle 10 is reduced below a series of speed thresholds if the speed of the vehicle 10 is greater than the respective speed threshold after predefined periods of time. This may correspond to the forced reduction of the speed of the vehicle 10, for example, because the driver has not yet parked the vehicle 10 in a suitable parking position despite the presence of an unexpected operating condition in the electronic steering system 12.

Figure 6:
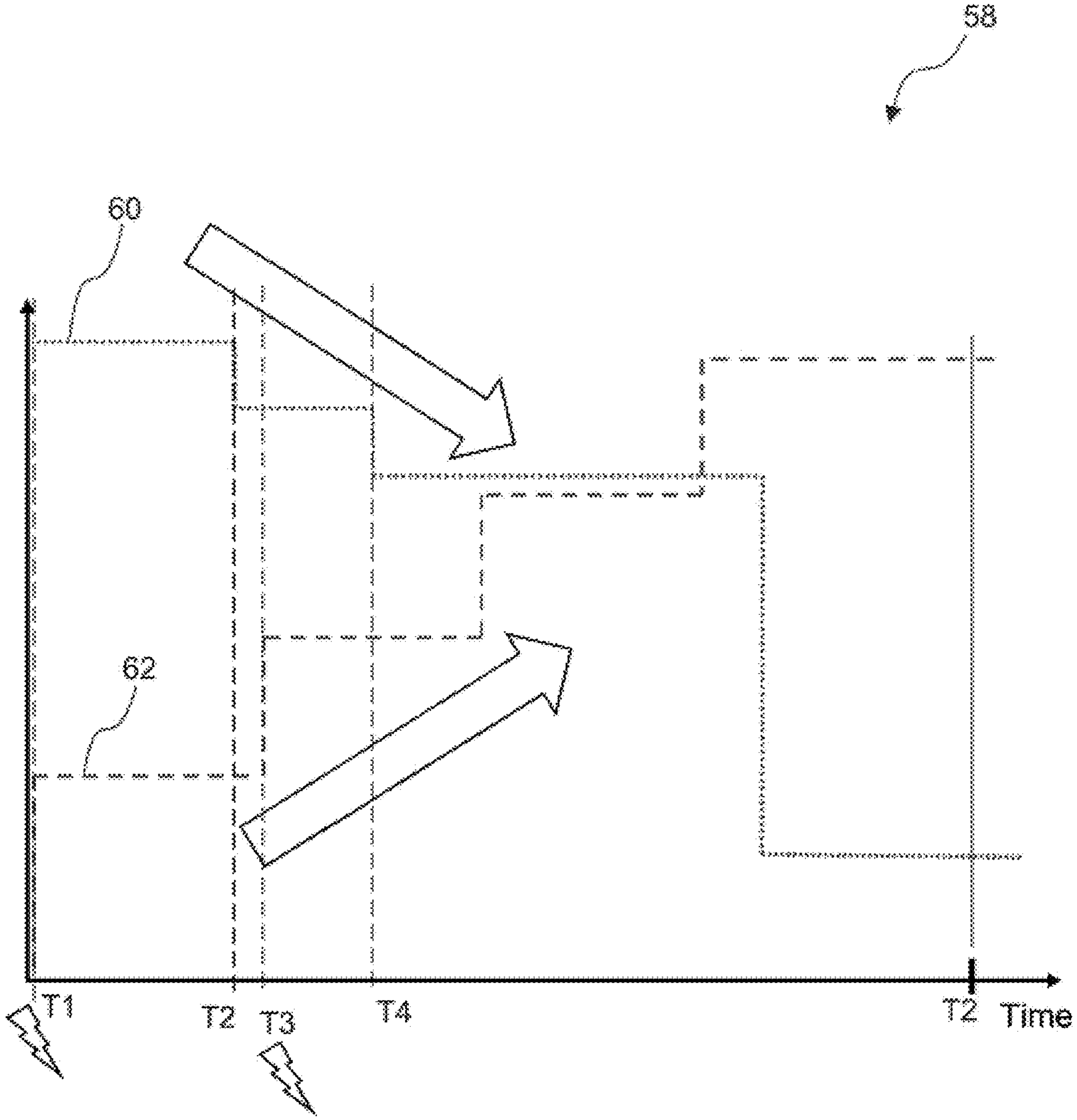
FIG. 6 shows an example graph of a gradual increase related to unexpected operating state notifications and reduction of vehicle speed.

FIG. 6 shows a representation 58 of a graph of a gradual increase in the relevance of unexpected operating state notifications 62 and the reduction of the vehicle speed 60. On the x-axis, the time is plotted against the relevance of the unexpected operating state notifications 62 and the maximum vehicle speed 60 on the y-axis.

At time T1, an unexpected operating condition occurs in the electronic steering system 12. As a result, a first unexpected operating state notification is issued to the driver of the vehicle 10, which has a first level. If the driver of the vehicle 10 does not reduce the speed of the vehicle 10, then at time T2, measured from time T1, a predefined period may have elapsed after which the maximum speed of the vehicle 10 is forcibly reduced to a level lower compared to the previous period. If at time T3 another unexpected operating condition occurs in the electronic steering system 12, a further unexpected operating state notification is issued to the driver of the vehicle 10, but which has a higher relevance (e.g., a higher level) in comparison with the previous notification. Again, measured at time T3, a predefined period is allowed to elapse. If the driver of the vehicle 10 again does not reduce the speed of the vehicle 10, then at time D4 the maximum speed of the vehicle 10 can be further reduced, namely to a level that is lower than that which was forced at time T2. A series of unexpected operating state notifications is thus formed, which have increasing relevance if further unexpected operating conditions occur in the electronic steering system 12. As such, a series of predefined periods of time can be provided in parallel with the series of unexpected operating state notifications with increasing relevance, in which the maximum speed of the vehicle 10 is forcibly reduced below a respective speed threshold value if this is not done by the driver of the vehicle 10. As a result, the method 50 ultimately only allows the vehicle 10 to be usable at any time at a speed that is appropriate in view of the unexpected operating conditions that have occurred in the electronic steering system 12. For example, the vehicle 10 can also be forced to drive at a speed which corresponds to a crawling speed.

The steering wheel actuator 32 may be configured such that a torque is applied to the steering wheel 30 based on a passive mode of action of the steering wheel actuator 32. For example, with regard to the feedback control devices 26 or steering control devices 38, unexpected operating conditions in the electronic steering system 12 can lead to a situation where the winding sets 22 of the electric motor 34 of the steering wheel actuator 32 can no longer be controlled appropriately.

To give the driver of the vehicle 10 feedback about the torque applied to the steerable road wheels 14 for the lateral control of the vehicle 10, windings of the winding sets 22 of the electric motor 34 of the steering wheel actuator 32 can then be short-circuited, coupled to a varying electrical resistance, or else an additional mechanical damping element can be activated to apply a mechanical frictional torque to the steering wheel 30. FIG. 7 shows a schematic representation of a steering wheel actuator 32 according to examples disclosed herein. Only a single winding set 22A of the electric motor 34 of the steering wheel actuator 32 is shown here. However, the functionality should be transferred to the other winding sets 22 of the steering wheel actuator 32.

In the example of FIG. 7, the winding set 22 comprises three windings 23A, 23B, 23C. The windings 23 are coupled to a steering control device 38 so that the electric motor 34 can be controlled accordingly. For example, corresponding phase voltages can be applied to the windings 23, so that phase currents are created in the windings 23 to drive a rotor of the electric motor 34. Ultimately, this results in providing a torque to the steering wheel 30 which is coupled to the electric motor 34.

In the example of FIG. 7, an electrical damping device 64 is coupled to the windings 23 of the winding set 22A. The electrical damping device 64 comprises a variable resistor. The electrical damping device 64 is configured to provide a variable electrical resistance between windings 23 with respect to the coupling of the windings 23 of the winding set 22A. The electrical damping device 64 can also ensure a short circuit between windings 23 of the winding set 22A. The electrical resistance forms a resistance of the steering wheel actuator 32, which can be used as passive torque feedback for the steering wheel 30 to give the driver of the vehicle 10 feedback about the torque applied to the steerable road wheels 14. In the normal operating state of the electronic steering system 12, the electrical damping device 64 can be deactivated, which can be ensured, for example, by a switching device 68 which is coupled to a supply circuit 70 for supplying power. If the supply circuit 70 is in an unexpected operating condition, the switching device 68 can trip (e.g., power-off closed) and as a result, activate the electrical damping device 64.

Alternatively or additionally, a mechanical damping element 66 may be at least indirectly coupled to the steering wheel 30. The mechanical damping element 66 can also be controlled by the switching device 68 and be configured to cause mechanical friction with respect to the steering wheel 30, for example, if the electric motor 34 is no longer usable. Thus, the driver of the vehicle 10 may, thus, be provided with a torque feedback signal despite an unexpected operating condition in the electronic steering system 12.

This means that, although the electric motor 34 is no longer controlled in accordance with its actual functionality, the steering wheel 30 can nevertheless be acted upon by a torque that gives the driver a sensation of the lateral control of the vehicle 10. The activation of these passive feedback torque mechanisms can be configured such that it is automatically triggered in the event of an unexpected operating condition in a supply circuit 70 for supplying power to the steering wheel actuator 32. This enhances the functionality of the electronic steering system 12.

The control of the damping parameters of the electrical damping element, the switching device 68 or the damping element 66 can also be carried out by an external control device, for example, the system control device 42 of the electronic steering system 12 or the higher-level driving control device 48.

The motor short-circuit element, the electrical damping element 64 and/or the mechanical damping element 66 can be part of a specific feedback channel 28, which then does not require any information about the position and/or movement of the steerable road wheel 14 and/or the steering wheel 30. In such examples, operation S1 for this feedback channel 28 can be omitted.

Specific examples disclosed herein use circuits (e.g., one or more circuits) to implement standards, protocols, methods or technologies disclosed herein, to couple two or more components in a functional manner, to generate information, to process information, to analyze information, to generate signals, to encode/decode signals, to convert signals, to transmit and/or receive signals, to control other devices, etc. Any type of circuit can be used.

In some examples, a circuit such as the control device comprises at least one or more data processing devices such as a processor (e.g., a microprocessor), a central processor unit (CPU), a digital signal processor (DSP), an application-specific integrated circuit (ASIC), a field programmable gate array (FPGA), a system on a chip (SoC) or similar, or any combination thereof, and may comprise discrete digital or analog circuitry or electronics or combinations thereof. In one example, the circuit comprises hardware circuit implementations (e.g., implementations in analog circuits, implementations in digital circuits and the like, and combinations thereof).

In some examples, circuits comprise combinations of circuits and computer program products with software or firmware instructions, which are stored on one or more computer-readable memories and interact to cause a device to perform one or more of the protocols, methods or technologies described herein. In one example, the circuit technology comprises circuits, such as microprocessors or parts of microprocessors, that use software, firmware and the like for their operation. In one example, the circuits comprise one or more processors or parts thereof and the associated software, firmware, hardware and the like.

Example instructions and/or operations of FIGS. 2A-2C may be implemented using executable instructions (e.g., computer-readable and/or machine-readable instructions) stored on one or more non-transitory computer-readable and/or machine-readable media. As used herein, the terms non-transitory computer-readable medium, non-transitory computer-readable storage medium, non-transitory machine-readable medium, and/or non-transitory machine-readable storage medium are expressly defined to include any type of computer-readable storage device and/or storage disk and to exclude propagating signals and to exclude transmission media. Examples of such non-transitory computer-readable medium, non-transitory computer-readable storage medium, non-transitory machine-readable medium, and/or non-transitory machine-readable storage medium include optical storage devices, magnetic storage devices, a hard disk drive (HDD), a flash memory, a read-only memory (ROM), a compact disc (CD), a digital versatile disc (DVD), a cache, a random-access memory (RAM) of any type, a register, and/or any other storage device or storage disk in which information is stored for any duration (e.g., for extended time periods, permanently, for brief instances, for temporarily buffering, and/or for caching of the information). As used herein, the terms "non-transitory computer-readable storage device" and "non-transitory machine-readable storage device" are defined to include any physical (mechanical, magnetic and/or electrical) hardware to retain information for a time period, but to exclude propagating signals and to exclude transmission media. Examples of non-transitory computer-readable storage devices and/or non-transitory machine-readable storage devices include random-access memory of any type, read-only memory of any type, solid-state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer-readable instructions, machine-readable instructions, etc., and/or manufactured to execute computer-readable instructions, machine-readable instructions, etc.

Figure 8:
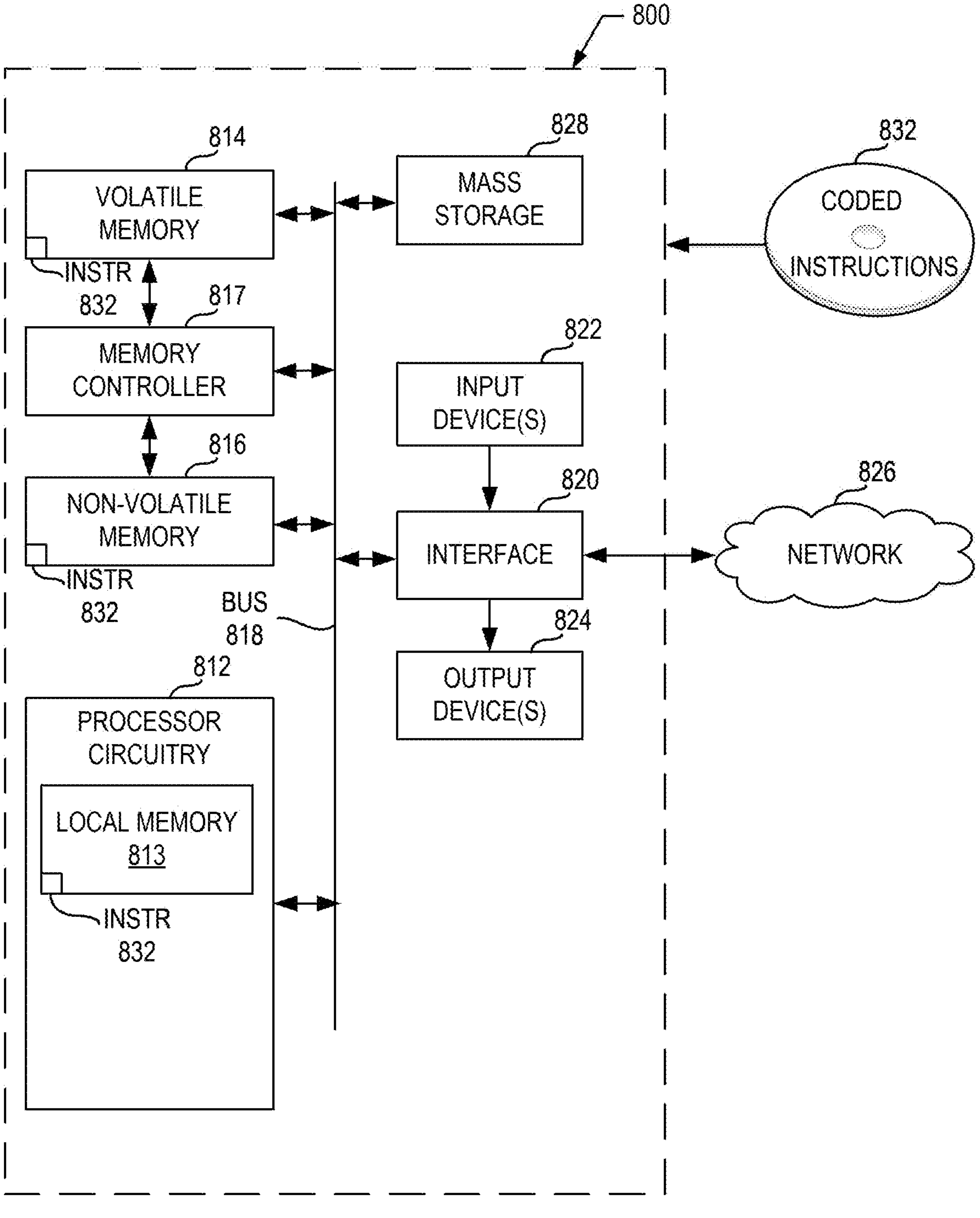
FIG. 8 is a block diagram of an example processing platform including programmable circuitry structured to execute, instantiate, and/or perform the example machine readable instructions and/or perform the example operations of FIGS. 2A-2C to implement examples disclosed herein.

FIG. 8 is a block diagram of an example programmable circuitry platform 800 structured to execute and/or instantiate the example machine-readable instructions and/or the example operations of FIGS. 2A-2C to implement examples disclosed herein. The programmable circuitry platform 800 can be, for example, a control device, an electronic control unit (ECU), a self-learning machine (e.g., a neural network), or any other type of computing and/or electronic device.

The programmable circuitry platform 800 of the illustrated example includes programmable circuitry 812. The programmable circuitry 812 of the illustrated example is hardware. For example, the programmable circuitry 812 can be implemented by one or more integrated circuits, logic circuits, FPGAS, microprocessors, CPUs, graphics processor units (GPUs), vision processor units (VPUs), DSPs, and/or microcontrollers from any desired family or manufacturer. The programmable circuitry 812 may be implemented by one or more semiconductor based (e.g., silicon based) devices.

The programmable circuitry 812 of the illustrated example includes a local memory 813 (e.g., a cache, registers, etc.). The programmable circuitry 812 of the illustrated example is in communication with main memory 814, 816, which includes a volatile memory 814 and a non-volatile memory 816, by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817. In some examples, the memory controller 817 may be implemented by one or more integrated circuits, logic circuits, microcontrollers from any desired family or manufacturer, or any other type of circuitry to manage the flow of data going to and from the main memory 814, 816.

The programmable circuitry platform 800 of the illustrated example also includes interface circuitry 820. The interface circuitry 820 may be implemented by hardware in accordance with any type of interface standard, such as a controller area network (CAN), an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user (e.g., a human user, a machine user, etc.) to enter data and/or commands into the programmable circuitry 812. The input device(s) 822 can be implemented by, for example, an audio sensor, a microphone, a camera (still or video), a button, a touchscreen, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), an in-place switching (IPS) display, a touchscreen, etc.), a tactile output device, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 800 of the illustrated example also includes one or more mass storage discs or devices 828 to store firmware, software, and/or data. Examples of such mass storage discs or devices 828 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or solid-state drives (SSDs).

The machine-readable instructions 832, which may be implemented by the machine-readable instructions of FIGS. 2A-2C, may be stored in the mass storage device 828, in the volatile memory 814, in the non-volatile memory 816, and/or on at least one non-transitory computer readable storage medium such as a CD or DVD which may be removable.

This disclosure may refer to quantities and figures. Unless expressly stated, such quantities and numbers shall not be considered as limiting, but as examples of the possible quantities or numbers in connection with the disclosure. In this context, the term "plurality" may also be used in the disclosure to refer to a quantity or number. In this context, the term "plurality" shall mean any number greater than one, for example, two, three, four, five, etc. The terms "roughly", "approximately", "near", etc. mean plus or minus 5% of the value specified.

Example methods, apparatus, systems, and articles of manufacture to implement electronic steering systems for vehicles are disclosed herein. Further examples and combinations thereof include the following:

Example 1 includes an electronic steering system comprising a first feedback control device to control application of first feedback torque to a steering wheel via a first feedback channel, a second feedback control device independent of the first feedback control device, the second feedback control device to control application of second feedback torque to the steering wheel via a second feedback channel, the second feedback channel independent of the first feedback channel, and a third feedback control device independent of the first and second feedback control devices, the third feedback control device to control application of third feedback torque to the steering wheel via a third feedback channel, the third feedback channel independent of the first and second feedback channels, wherein ones of the first, second, and third feedback control devices are to control the application of corresponding ones of the first, second, and third feedback torques to the steering wheel by detecting at least one of a position or a movement of a steerable road wheel, determining the corresponding ones of the first, second, and third feedback torques based on the at least one of the position or the movement of the steerable road wheel, and controlling the application of the corresponding ones of the first, second, and third feedback torques to the steering wheel via corresponding ones of the first, second, and third feedback channels.

Example 2 includes any preceding clause(s) of Example 1, including a first steering control device to control application of a first road wheel torque to the steerable road wheel via a first steering channel, and a second steering control device to control application of a second road wheel torque to the steerable road wheel via a second steering channel, the second steering channel independent of the first steering channel, wherein ones of the first and second steering control devices are to control the application of corresponding ones of the first and second road wheel torques by detecting at least one of a position or a movement of the steering wheel, determining a torque input based on the at least one of the position or the movement of the steering wheel, and controlling the application of the corresponding ones of the first and second road wheel torques to the steerable road wheel based on the torque input.

Example 3 includes any preceding clause(s) of any one or more of Examples 1-2, including a first steering wheel sensor to obtain the at least one of the position or the movement of the steering wheel to be used in the first feedback channel, a second steering wheel sensor to obtain the at least one of the position or the movement of the steering wheel to be used in the second feedback channel, and a third steering wheel sensor to obtain the at least one of the position or the movement of the steering wheel to be used in the third feedback channel.

Example 4 includes any preceding clause(s) of any one or more of Examples 1-3, including a first road wheel sensor to obtain the at least one of the position or the movement of the steerable road wheel to be used in the first feedback channel, a second road wheel sensor to obtain the at least one of the position or the movement of the steerable road wheel to be used in the second feedback channel, and a third road wheel sensor to obtain the at least one of the position or the movement of the steerable road wheel to be used in the third feedback channel.

Example 5 includes any preceding clause(s) of any one or more of Examples 1-4, wherein at least one of the first, second, or third feedback channels is to control the application of a corresponding one of the first, second, or third feedback torques to the steering wheel by causing a short-circuit of windings in an electric motor of a steering wheel actuator.

Example 6 includes any preceding clause(s) of any one or more of Examples 1-5, wherein at least one of the first, second, or third feedback channels is to control the application of a corresponding one of the first, second, or third feedback torques to the steering wheel by at least one of:

varying a resistance between windings of an electric motor of a steering wheel actuator; or activating a mechanical damping element to apply a mechanical frictional torque to the steering wheel.

Example 7 includes any preceding clause(s) of any one or more of Examples 1-6, wherein at least one of the first, second, or third feedback channels controls the application of a corresponding one of the first, second, or third feedback torques to the steering wheel by at least one of (a) causing a short-circuit of windings of an electric motor of a steering wheel actuator or (b) varying a resistance between the windings of the electric motor, without providing control signals to the steering wheel actuator, and at least another one of the first, second, or third feedback channels controls the application of the corresponding one of the first, second, or third feedback torques to the steering wheel by sending a control signal to the steering wheel actuator.

Example 8 includes a non-transitory machine-readable storage medium comprising instructions to cause at least a first feedback control device to control application of a first feedback torque to a steering wheel via a first feedback channel, a second feedback control device to control application of a second feedback torque to the steering wheel via a second feedback channel, the second feedback control device independent of the first feedback control device, and the second feedback channel independent of the first feedback channel, and a third feedback control device to control application of a third feedback torque to the steering wheel via a third feedback channel, the third feedback control device independent of the first and second feedback control devices, the third feedback channel independent of the first and second feedback channels, wherein ones of the first, second, and third feedback control devices are to control the application of corresponding ones of the first, second, and third feedback torques to the steering wheel by detecting at least one of a position or a movement of a steerable road wheel, determining the corresponding ones of the first, second, and third feedback torques based on the at least one of the position or the movement of the steerable road wheel, and controlling the application of the corresponding ones of the first, second, and third feedback torques to the steering wheel via corresponding ones of the first, second, and third feedback channels.

Example 9 includes any preceding clause(s) of Example 8, wherein the instructions are to cause a first steering control device to control application of a first road wheel torque to the steerable road wheel via a first steering channel, and a second steering control device to control application of a second road wheel torque to the steerable road wheel via a second steering channel, the second steering channel independent of the first steering channel, wherein ones of the first and second steering control devices are to control the application of corresponding ones of the first and second road wheel torques by detecting at least one of a position or a movement of the steering wheel, determining a torque input based on the at least one of the position or the movement of the steering wheel, and controlling the application of the corresponding ones of the first and second road wheel torques to the steerable road wheel based on the torque input.

Example 10 includes any preceding clause(s) of any one or more of Examples 8-9, wherein the instructions are to cause the first steering control device to obtain the at least one of the position or the movement of the steering wheel from a first steering wheel sensor, and the second steering control device to obtain the at least one of the position or the movement of the steering wheel from a second steering wheel sensor.

Example 11 includes any preceding clause(s) of any one or more of Examples 8-10, wherein the instructions are to cause the first feedback control device to obtain the at least one of the position or the movement of the steerable road wheel from a first road wheel sensor, the second feedback control device to obtain the at least one of the position or the movement of the steerable road wheel from a second road wheel sensor, and the third feedback control device to obtain the at least one of the position or the movement of the steerable road wheel from a third road wheel sensor.

Example 12 includes any preceding clause(s) of any one or more of Examples 8-11, wherein the instructions are to cause at least one of the first, second, or third feedback control devices to control the application of a corresponding one of the first, second, or third feedback torques to the steering wheel by causing a short-circuit of windings in an electric motor of a steering wheel actuator.

Example 13 includes any preceding clause(s) of any one or more of Examples 8-12, wherein the instructions are to cause at least one of the first, second, or third feedback control devices to control the application of a corresponding one of the first, second, or third feedback torques to the steering wheel by varying a resistance between windings of an electric motor of a steering wheel actuator.

Example 14 includes any preceding clause(s) of any one or more of Examples 8-13, wherein the instructions are to cause at least one of the first, second, or third feedback control devices to control the application of a corresponding one of the first, second, or third feedback torques to the steering wheel by at least one of (a) causing a short-circuit of windings of an electric motor of a steering wheel actuator or (b) varying a resistance between the windings of the electric motor, without providing control signals to the steering wheel actuator, and at least another one of the first, second, or third feedback control devices to control the application of the corresponding one of the first, second, or third feedback torques to the steering wheel by sending a control signal to the steering wheel actuator.

Example 15 includes a method comprising controlling, via a first feedback control device, application of a first feedback torque to a steering wheel via a first feedback channel, controlling, via a second feedback control device, application of a second feedback torque to the steering wheel via a second feedback channel, the second feedback control device independent of the first feedback control device, and the second feedback channel independent of the first feedback channel, and controlling, via a third feedback control device, application of a third feedback torque to the steering wheel via a third feedback channel, the third feedback control device independent of the first and second feedback control devices, the third feedback channel independent of the first and second feedback channels, wherein the controlling of the application of the first, second, and third feedback torques to the steering wheel includes detecting at least one of a position or a movement of a steerable road wheel, determining the corresponding ones of the first, second, and third feedback torques based on the at least one of the position or the movement of the steerable road wheel, and controlling the application of the corresponding ones of the first, second, and third feedback torques to the steering wheel via corresponding ones of the first, second, and third feedback channels.

Example 16 includes any preceding clause(s) of Example 15, including controlling, via a first steering control device, application of a first road wheel torque to the steerable road wheel via a first steering channel, and controlling, via a second steering control device, application of a second road wheel torque to the steerable road wheel via a second steering channel, the second steering channel independent of the first steering channel, wherein the controlling of the application of corresponding ones of the first and second road wheel torques includes detecting at least one of a position or a movement of the steering wheel, determining a torque input based on the at least one of the position or the movement of the steering wheel, and controlling the application of the corresponding ones of the first and second road wheel torques to the steerable road wheel based on the torque input.

Example 17 includes any preceding clause(s) of any one or more of Examples 15-16, including obtaining the at least one of the position or the movement of the steering wheel from a first steering wheel sensor, and obtaining the at least one of the position or the movement of the steering wheel from a second steering wheel sensor.

Example 18 includes any preceding clause(s) of any one or more of Examples 15-17, including obtaining the at least one of the position or the movement of the steerable road wheel from a first road wheel sensor, obtaining the at least one of the position or the movement of the steerable road wheel from a second road wheel sensor, and obtaining the at least one of the position or the movement of the steerable road wheel from a third road wheel sensor.

Example 19 includes any preceding clause(s) of any one or more of Examples 15-18, wherein the controlling the application of at least one of the first, second, or third feedback torques to the steering wheel includes causing a short-circuit of windings in an electric motor of a steering wheel actuator.

Example 20 includes any preceding clause(s) of any one or more of Examples 15-19, wherein the controlling of the application of at least one of the first, second, or third feedback torques to the steering wheel includes at least one of (a) causing a short-circuit of windings of an electric motor of a steering wheel actuator or (b) varying a resistance between the windings of the electric motor, without providing control signals to the steering wheel actuator, and the controlling of the application of at least another one of the first, second, or third feedback torques to the steering wheel includes sending a control signal to the steering wheel actuator.

Although the disclosure has been presented and described with respect to one or more examples, after reading and understanding this description and the accompanying drawings, a person skilled in the art will be able to make equivalent changes and modifications.

What is claimed is:

1. An electronic steering system comprising:

a first feedback control device to control application of first feedback torque to a steering wheel via a first feedback channel;

a second feedback control device independent of the first feedback control device, the second feedback control device to control application of second feedback torque to the steering wheel via a second feedback channel, the second feedback channel independent of the first feedback channel; and a third feedback control device independent of the first and second feedback control devices, the third feedback control device to control application of third feedback torque to the steering wheel via a third feedback channel, the third feedback channel independent of the first and second feedback channels, wherein ones of the first, second, and third feedback control devices are to control the application of corresponding ones of the first, second, and third feedback torques to the steering wheel by:

detecting at least one of a position or a movement of a steerable road wheel;

determining the corresponding ones of the first, second, and third feedback torques based on the at least one of the position or the movement of the steerable road wheel; and controlling the application of the corresponding ones of the first, second, and third feedback torques to the steering wheel via corresponding ones of the first, second, and third feedback channels.

2. The electronic steering system of claim 1, including:

a first steering control device to control application of a first road wheel torque to the steerable road wheel via a first steering channel; and a second steering control device to control application of a second road wheel torque to the steerable road wheel via a second steering channel, the second steering channel independent of the first steering channel, wherein ones of the first and second steering control devices are to control the application of corresponding ones of the first and second road wheel torques by:

detecting at least one of a position or a movement of the steering wheel;

determining a torque input based on the at least one of the position or the movement of the steering wheel; and controlling the application of the corresponding ones of the first and second road wheel torques to the steerable road wheel based on the torque input.

3. The electronic steering system of claim 2, including:

a first steering wheel sensor to obtain the at least one of the position or the movement of the steering wheel to be used in the first feedback channel;

a second steering wheel sensor to obtain the at least one of the position or the movement of the steering wheel to be used in the second feedback channel; and a third steering wheel sensor to obtain the at least one of the position or the movement of the steering wheel to be used in the third feedback channel.

4. The electronic steering system of claim 1, including:

a first road wheel sensor to obtain the at least one of the position or the movement of the steerable road wheel to be used in the first feedback channel;

a second road wheel sensor to obtain the at least one of the position or the movement of the steerable road wheel to be used in the second feedback channel; and a third road wheel sensor to obtain the at least one of the position or the movement of the steerable road wheel to be used in the third feedback channel.

5. The electronic steering system of claim 1, wherein ones of the first, second, and third feedback channels are to control the application of the corresponding ones of the first, second, and third feedback torques to the steering wheel by causing short-circuits of winding sets in electric motors of steering wheel actuators of corresponding ones of the first, second, and third feedback channels, each of the steering wheel actuators including independent ones of the winding sets in a corresponding one of the electric motors, the electric motors coupled to the steering wheel.

6. The electronic steering system of claim 1, wherein at least one of the first, second, or third feedback channels is to control the application of a corresponding one of the first, second, or third feedback torques to the steering wheel by at least one of:

varying a resistance between windings of an electric motor of a steering wheel actuator; or activating a mechanical damping element to apply a mechanical frictional torque to the steering wheel.

7. The electronic steering system of claim 1, wherein:

at least one of the first, second, or third feedback channels controls the application of a corresponding one of the first, second, or third feedback torques to the steering wheel by at least one of: (a) causing a short-circuit of windings of an electric motor of a steering wheel actuator or (b) varying a resistance between the windings of the electric motor, without providing control signals to the steering wheel actuator; and at least another one of the first, second, or third feedback channels controls the application of the corresponding one of the first, second, or third feedback torques to the steering wheel by sending a control signal to the steering wheel actuator.

8. A non-transitory machine-readable storage medium comprising instructions to cause at least:

a first feedback control device to control application of a first feedback torque to a steering wheel via a first feedback channel;

a second feedback control device to control application of a second feedback torque to the steering wheel via a second feedback channel, the second feedback control device independent of the first feedback control device, and the second feedback channel independent of the first feedback channel; and a third feedback control device to control application of a third feedback torque to the steering wheel via a third feedback channel, the third feedback control device independent of the first and second feedback control devices, the third feedback channel independent of the first and second feedback channels, wherein ones of the first, second, and third feedback control devices are to control the application of corresponding ones of the first, second, and third feedback torques to the steering wheel by:

detecting at least one of a position or a movement of a steerable road wheel;

determining the corresponding ones of the first, second, and third feedback torques based on the at least one of the position or the movement of the steerable road wheel; and controlling the application of the corresponding ones of the first, second, and third feedback torques to the steering wheel via corresponding ones of the first, second, and third feedback channels.

9. The non-transitory machine-readable storage medium of claim 8, wherein the instructions are to cause:

a first steering control device to control application of a first road wheel torque to the steerable road wheel via a first steering channel; and a second steering control device to control application of a second road wheel torque to the steerable road wheel via a second steering channel, the second steering channel independent of the first steering channel, wherein ones of the first and second steering control devices are to control the application of corresponding ones of the first and second road wheel torques by:

detecting at least one of a position or a movement of the steering wheel;

determining a torque input based on the at least one of the position or the movement of the steering wheel; and controlling the application of the corresponding ones of the first and second road wheel torques to the steerable road wheel based on the torque input.

10. The non-transitory machine-readable storage medium of claim 9, wherein the instructions are to cause:

the first steering control device to obtain the at least one of the position or the movement of the steering wheel from a first steering wheel sensor; and the second steering control device to obtain the at least one of the position or the movement of the steering wheel from a second steering wheel sensor.

11. The non-transitory machine-readable storage medium of claim 8, wherein the instructions are to cause:

the first feedback control device to obtain the at least one of the position or the movement of the steerable road wheel from a first road wheel sensor;

the second feedback control device to obtain the at least one of the position or the movement of the steerable road wheel from a second road wheel sensor; and the third feedback control device to obtain the at least one of the position or the movement of the steerable road wheel from a third road wheel sensor.

12. The non-transitory machine-readable storage medium of claim 8, wherein the instructions are to cause at least one of the first, second, or third feedback control devices to control the application of a corresponding one of the first, second, or third feedback torques to the steering wheel by causing a short-circuit of windings in an electric motor of a steering wheel actuator.

13. The non-transitory machine-readable storage medium of claim 8, wherein the instructions are to cause at least one of the first, second, or third feedback control devices to control the application of a corresponding one of the first, second, or third feedback torques to the steering wheel by varying a resistance between windings of an electric motor of a steering wheel actuator.

14. The non-transitory machine-readable storage medium of claim 8, wherein the instructions are to cause:

at least one of the first, second, or third feedback control devices to control the application of a corresponding one of the first, second, or third feedback torques to the steering wheel by at least one of: (a) causing a short-circuit of windings of an electric motor of a steering wheel actuator or (b) varying a resistance between the windings of the electric motor, without providing control signals to the steering wheel actuator; and at least another one of the first, second, or third feedback control devices to control the application of the corresponding one of the first, second, or third feedback torques to the steering wheel by sending a control signal to the steering wheel actuator.

15. A method comprising:

controlling, via a first feedback control device, application of a first feedback torque to a steering wheel via a first feedback channel;

controlling, via a second feedback control device, application of a second feedback torque to the steering wheel via a second feedback channel, the second feedback control device independent of the first feedback control device, and the second feedback channel independent of the first feedback channel; and controlling, via a third feedback control device, application of a third feedback torque to the steering wheel via a third feedback channel, the third feedback control device independent of the first and second feedback control devices, the third feedback channel independent of the first and second feedback channels, wherein the controlling of the application of the first, second, and third feedback torques to the steering wheel includes:

detecting at least one of a position or a movement of a steerable road wheel;

determining the corresponding ones of the first, second, and third feedback torques based on the at least one of the position or the movement of the steerable road wheel; and controlling the application of the corresponding ones of the first, second, and third feedback torques to the steering wheel via corresponding ones of the first, second, and third feedback channels.

16. The method of claim 15, including:

controlling, via a first steering control device, application of a first road wheel torque to the steerable road wheel via a first steering channel; and controlling, via a second steering control device, application of a second road wheel torque to the steerable road wheel via a second steering channel, the second steering channel independent of the first steering channel, wherein the controlling of the application of corresponding ones of the first and second road wheel torques includes:

detecting at least one of a position or a movement of the steering wheel;

determining a torque input based on the at least one of the position or the movement of the steering wheel; and controlling the application of the corresponding ones of the first and second road wheel torques to the steerable road wheel based on the torque input.

17. The method of claim 16, including:

obtaining the at least one of the position or the movement of the steering wheel from a first steering wheel sensor; and obtaining the at least one of the position or the movement of the steering wheel from a second steering wheel sensor.

18. The method of claim 15, including:

obtaining the at least one of the position or the movement of the steerable road wheel from a first road wheel sensor;

obtaining the at least one of the position or the movement of the steerable road wheel from a second road wheel sensor; and obtaining the at least one of the position or the movement of the steerable road wheel from a third road wheel sensor.

19. The method of claim 15, wherein the controlling the application of at least one of the first, second, or third feedback torques to the steering wheel includes causing a short-circuit of windings in an electric motor of a steering wheel actuator.

20. The method of claim 15, wherein:

the controlling of the application of at least one of the first, second, or third feedback torques to the steering wheel includes at least one of: (a) causing a short-circuit of windings of an electric motor of a steering wheel actuator or (b) varying a resistance between the windings of the electric motor, without providing control signals to the steering wheel actuator; and the controlling of the application of at least another one of the first, second, or third feedback torques to the steering wheel includes sending a control signal to the steering wheel actuator.

* * * * *